US011021552B2

(12) United States Patent
Harlan et al.

(10) Patent No.: US 11,021,552 B2
(45) Date of Patent: Jun. 1, 2021

(54) TOLUENE FREE SILICA SUPPORTED SINGLE-SITE METALLOCENE CATALYSTS FROM IN-SITU SUPPORTED ALUMOXANE FORMATION IN ALIPHATIC SOLVENTS

(71) Applicant: ExxonMobil Chemical Patents Inc., Baytown, TX (US)

(72) Inventors: Charles J. Harlan, Houston, TX (US); Steven C. Haas, Houston, TX (US); Lubin Luo, Houston, TX (US); Francis C. Rix, Houston, TX (US); Xuan Ye, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 81 days.

(21) Appl. No.: 16/133,262

(22) Filed: Sep. 17, 2018

(65) Prior Publication Data
US 2019/0127499 A1  May 2, 2019

Related U.S. Application Data

(60) Provisional application No. 62/579,578, filed on Oct. 31, 2017.

(51) Int. Cl.
| | | |
|---|---|---|
| *C07F 5/06* | (2006.01) | |
| *C08F 4/642* | (2006.01) | |
| *C08F 10/02* | (2006.01) | |
| *C08F 4/659* | (2006.01) | |
| *C08F 4/6592* | (2006.01) | |

(52) U.S. Cl.
CPC .............. *C08F 10/02* (2013.01); *C07F 5/068* (2013.01); *C08F 4/6592* (2013.01); *C08F 4/65916* (2013.01); *C08F 2410/00* (2013.01); *C08F 2420/02* (2013.01)

(58) Field of Classification Search
CPC .................................. C07F 5/068; C08F 4/642
See application file for complete search history.

(56) References Cited

U.S. PATENT DOCUMENTS

| | | | |
|---|---|---|---|
| 4,935,397 A | 6/1990 | Chang | |
| 4,937,217 A | 6/1990 | Chang | |
| 5,006,500 A | 4/1991 | Chang | |
| 5,015,749 A | 5/1991 | Schmidt et al. | |
| 5,468,702 A | 11/1995 | Jejelowo | |
| 5,529,965 A | 6/1996 | Chang | |
| 5,616,665 A | 4/1997 | Jejelowo et al. | |
| 5,629,253 A | 5/1997 | Chang | 502/111 |
| 5,777,143 A | 7/1998 | Malpass et al. | |
| 5,831,109 A * | 11/1998 | Smith | B01J 31/143 556/179 |
| 6,211,111 B1 | 4/2001 | Chen et al. | |
| 7,232,869 B2 | 6/2007 | Sell et al. | |
| 7,910,764 B2 | 3/2011 | Kaji et al. | |
| 7,928,172 B2 | 4/2011 | Luo et al. | |
| 8,354,485 B2 | 1/2013 | Luo et al. | |
| 8,404,880 B2 | 3/2013 | Kaji et al. | C07F 5/06 |
| 8,575,284 B2 | 11/2013 | Luo et al. | |
| 9,090,720 B2 | 7/2015 | Luo et al. | |
| 10,323,047 B2* | 6/2019 | Bergsma | C07F 5/068 |
| 10,414,887 B2 | 9/2019 | Ye et al. | C08F 5/18 |
| 2003/0236365 A1 | 12/2003 | Tian et al. | C08F 2/00 |
| 2009/0240010 A1 | 9/2009 | McDaniel et al. | 526/130 |
| 2011/0253418 A1 | 10/2011 | Ek et al. | 174/110 |
| 2013/0029834 A1 | 1/2013 | Luo et al. | |
| 2013/0253155 A1 | 9/2013 | Luo | |
| 2016/0272658 A1 | 9/2016 | van der Kruijs et al. | |
| 2016/0355618 A1 | 12/2016 | Luo et al. | |
| 2018/0134731 A1* | 5/2018 | Bergsma | C07F 5/068 |

FOREIGN PATENT DOCUMENTS

| | | | |
|---|---|---|---|
| JP | H06192274 | 7/1994 | ............... C07F 5/06 |
| WO | 94/26793 | 11/1994 | |
| WO | 2016/170017 | 10/2016 | |
| WO | WO2016/170017 | * 10/2016 | |

OTHER PUBLICATIONS

Luo et al., "Evidence of Coordinated Trimethylaluminum (TMA) in Methylaluminoxane (MAO) as the Major Active Site for Single-Site Catalyst Activation and Its Quantification," ACS Annual Meeting, Conference Abstracts PMSE 126, Apr. 3, 2017, Slides 1-22.
Sinn, et al, "Formation, Structure, and Mechanism of Oligomeric Methylaluminoxane", in Kaminsky (ed.), Metalorg. Cat. for Synth. & Polym., Springer-Verlag, 1999, pp. 105-122.
Luo et al., "Evidence of Coordinated Trimethylaluminum (TMA) in Methylaluminoxane (MAO) as the Major Active Site for Single-Site Catalyst Activation and Its Quantification," ACS Annual Meeting, Conference Abstracts INOR 1169, Apr. 5, 2017, Slides 1-26.
Streitwieser, Jr. and Heathcock, Macmillian Publishing Co. Inc. (1981) *Introduction to Organic Chemistry*, 2nd Edition, pp. 40 and 78.

* cited by examiner

*Primary Examiner* — Caixia Lu

(57) ABSTRACT

The present disclosure provides methods for preparing a catalyst system comprising contacting in an aliphatic solvent at least one support material, at least one hydrocarbyl aluminum compound and at least one non-hydrolytic active oxygen-containing compound to form a supported alumoxane (catalyst system precursor) and contacting the supported alumoxane with at least one catalyst compound having a Group 3 through Group 12 metal atom or lanthanide metal atom. The supported alumoxane may be heated prior to contact with the catalyst compound.

25 Claims, No Drawings

TOLUENE FREE SILICA SUPPORTED SINGLE-SITE METALLOCENE CATALYSTS FROM IN-SITU SUPPORTED ALUMOXANE FORMATION IN ALIPHATIC SOLVENTS

PRIORITY CLAIM

This application claims priority to and the benefit of U.S. Ser. No. 62/579,578, filed Oct. 31, 2017 and is incorporated by reference in its entirety.

FIELD

The present disclosure relates to catalyst systems for olefin polymerization, catalyst system precursors, methods of producing the precursors and catalyst systems and polyolefins formed from the catalyst systems.

BACKGROUND

Polyolefins are widely used commercially because of their robust physical properties. For example, various types of polyethylenes, including high density, low density, and linear low density polyethylenes, are some of the most commercially useful. Polyolefins are typically prepared with a catalyst (mixed with one or more other components to form a catalyst system) which promotes polymerization of olefin monomers in a reactor, such as a gas phase reactor.

Methylalumoxane, or MAO, is the most popular activator supported on silica to activate a single site catalyst precursor, e.g., a metallocene, to form an active solid catalyst used in a commercial gas phase reactor to produce single-site polyolefin resins. Commercial MAO is commonly sold as a toluene solution because an aromatic solvent can dissolve MAO without causing any issue observed with other solvents, e.g., a donor containing solvent (e.g., an ether or a THF) deactivates MAO, an active proton containing solvent (e.g., an alcohol) reacts and destroys MAO, and an aliphatic solvent (e.g., hexane) precipitates MAO. However, the MAO toluene solution is stored in a cold environment, e.g., at −20 to −30° C., to reduce the gelation process typically observed for this kinetic product. A homogeneous MAO solution is desired for MAO molecules to be evenly distributed in the pores of the a catalyst support material, e.g., silica, to obtain a catalyst with good performance including good productivity and good operability. However, polyolefin products are often used as plastic packaging for sensitive products, and the amount of non-polyolefin compounds, such as toluene, present in the polyolefin products should be minimized.

References of interest include: U.S. Pat. Nos. 8,354,485; 9,090,720; US 2016/0355618; WO 2016/170017; U.S. Pat. Nos. 7,910,764; 8,575,284; 5,006,500; 4,937,217; Luo, Jain, and Harlan, ACS Annual Meeting, Conference Abstracts PMSE 126 and INOR 1169, Apr. 2-6, 2017; and Sinn, et al, "Formation, Structure, and Mechanism of Oligomeric Methylaluminoxane", in Kaminsky (ed.), Metalorg. Cat. for Synth. & Polym., Springer-Verlag, 1999, pp 105).

Therefore, there is a need for catalyst systems free from a detectable amount of aromatic solvent, while maintaining good performance including good productivity and good operability. There is also a need for methods of forming such catalyst systems. There is also a need for polyolefins that are free from a detectable amount of aromatic solvent.

In addition, commercially available MAO is provided in a toluene solution and is unstable, typically involving special handling and cold storage. The commercially available MAO has a short life, typically less than one week under ambient conditions and less than twelve months in cold storage, and undergoes compositional changes, e.g. gelation, even in cold storage. Therefore, there is also a need for more stable MAO compositions.

SUMMARY

In some embodiments, the present disclosure provides a method for preparing supported alumoxane comprising contacting in an aliphatic solvent at least one support material, at least one hydrocarbyl aluminum compound and at least one non-hydrolitic active oxygen-containing compound. The supported alumoxane is more stable, relative to prior art alumoxanes, and is free of a detectable amount of aromatic solvent.

In some embodiments, the present disclosure provides a method for preparing a catalyst system comprising contacting in an aliphatic solvent at least one support material, at least one hydrocarbyl aluminum compound and at least one non-hydrolytic active oxygen-containing compound to form a supported alumoxane (catalyst system precursor). In some embodiments, the solid supported alumoxane is contacted with at least one catalyst compound having a Group 3 through Group 12 metal atom or lanthanide metal atom. The supported alumoxane may be heated prior to contact with the catalyst compound.

In other embodiments, the present disclosure provides a catalyst system including a catalyst compound having a Group 3 through Group 12 metal atom or lanthanide metal atom. The catalyst system further includes supported alumoxane and has no detectable amount of aromatic solvent.

DETAILED DESCRIPTION

The present disclosure relates to catalyst systems for olefin polymerization, methods of producing the catalyst systems, and polyolefins formed from the catalyst systems. Embodiments of the present disclosure include methods for preparing a supported alumoxane including contacting in an aliphatic solvent at least one support material, at least one hydrocarbyl aluminum compound and at least one non-hydrolytic active oxygen-containing compound. The supported alumoxane is formed in-situ when the hydrocarbyl aluminum compound reacts with the non-hydrolytic active oxygen-containing compound. This contact of the hydrocarbyl aluminum compound and non-hydrolytic active oxygen-containing compound may take place initially without the presence of the support material which may subsequently be added in an additional step. The contact of the hydrocarbyl aluminum compound and the non-hydrolytic active oxygen-containing compound may also take place in the presence of the support material. The present disclosure also includes methods for preparing catalyst systems including heating the supported alumoxane prior to contact with a catalyst compound. The catalyst compound has a Group 3 through Group 12 metal atom or lanthanide metal atom. The catalyst compound can be a metallocene catalyst compound comprising a Group 4 metal.

In at least one embodiment, the present disclosure relates to a continuous process for preparing supported alumoxane comprising contacting in an aliphatic solvent at least one support material, at least one hydrocarbyl aluminum compound and at least one non-hydrolytic active oxygen-containing compound to produce a silica supported alumoxane, separating the silica supported alumoxane from the aliphatic solvent and recycling the aliphatic solvent and any excess hydrocarbyl aluminum or other compounds produced which could be recycled in a continuous process.

Embodiments of the present disclosure also include catalyst systems including a Group 4 metal catalyst compound selected from a metallocene catalyst compound or a bis (phenolate) catalyst compound.

Use of an aliphatic solvent instead of toluene provides a catalyst system (and polyolefin products) with no detectable amount of aromatic hydrocarbon solvent content while maintaining activity similar to that of catalyst systems prepared with pre-formed MAO and or using toluene. Maintaining activity would not be expected since catalyst system components such as methylalumoxane precipitate in the presence of saturated hydrocarbon.

Eliminating aromatic hydrocarbon solvent in the catalyst system provides polyolefin products having no detectable aromatic hydrocarbon solvent (preferably no detectable toluene), as determined by gas phase chromatography as described in the Test Methods section below. The polyolefin products may be used as plastic materials for use in toluene-free materials such as in packaging for food products. Furthermore, many saturated hydrocarbons have lower boiling points than aromatic hydrocarbons, such as toluene (110° C.), which makes the saturated hydrocarbons easier to remove from the polyolefin products.

For purposes of the present disclosure, "detectable aromatic hydrocarbon solvent" means 0.1 mg/m$^2$ or more as determined by gas phase chromatography. For purposes of the present disclosure, "detectable toluene" means 0.1 mg/m$^2$ or more as determined by gas phase chromatography.

Preferably polyolefin products produced herein contain less than 0.1 mg/m$^2$ aromatic hydrocarbon solvent (i.e., toluene), preferably less than 0.05 mg/m$^2$, as determined by gas phase chromatography.

As used herein, the term "saturated hydrocarbon" includes hydrocarbons that contain zero carbon-carbon double bonds. The saturated hydrocarbon can be a linear or cyclic hydrocarbon. The saturated hydrocarbon can be a $C_4$-$C_{40}$ hydrocarbon, such as a $C_4$-$C_7$ hydrocarbon. In at least one embodiment, the $C_4$-$C_{40}$ hydrocarbon is isobutene, cyclohexane, isopentane, isohexane, hexane, heptane, or mixtures thereof.

In at least one embodiment, a method of polymerizing olefins to produce a polyolefin composition includes contacting at least one olefin with a catalyst system of the present disclosure and obtaining a polyolefin having no detectable aromatic hydrocarbon solvent. Polymerization can be conducted at a temperature of from about 0° C. to about 300° C., at a pressure of from about 0.35 MPa to about 10 MPa, and at a time up to about 400 minutes. The at least one olefin can be $C_2$ to $C_{40}$ olefin, preferably $C_2$ to $C_{20}$ alpha-olefin preferably ethylene, propylene, butene, pentene, hexene, heptene, octene, nonene, decene, undecene, dodecene, or mixtures thereof.

For purposes of the present disclosure, the numbering scheme for the Periodic Table Groups is used as described in CHEMICAL AND ENGINEERING NEWS, 63(5), pg. 27 (1985). Therefore, a "Group 4 metal" is an element from group 4 of the Periodic Table, e.g., Hf, Ti, or Zr.

"Catalyst productivity" is a measure of how many grams of polymer (P) are produced using a polymerization catalyst comprising W g of catalyst (cat), over a period of time of T hours; and may be expressed by the following formula: P/(T×W) and expressed in units of gPgcat$^{-1}$ hr$^{-1}$. Conversion is the amount of monomer that is converted to polymer product, and is reported as mol % and is calculated based on the polymer yield (weight) and the amount of monomer fed into the reactor. Catalyst activity is a measure of the level of activity of the catalyst and is reported as the mass of product polymer (P) produced per mass of supported catalyst (cat) (gP/g supported cat). In an at least one embodiment, the activity of the catalyst is at least 800 gpolymer/gsupported catalyst/hour, such as about 1,000 or more gpolymer/gsupported catalyst/hour, such as about 2,000 or more gpolymer/gsupported catalyst/hour, such as about 3,000 or more gpolymer/gsupported catalyst/hour, such as about 4,000 or more gpolymer/gsupported catalyst/hour, such as about 5,000 or more gpolymer/gsupported catalyst/hour, such as about 6,000 or more gpolymer/gsupported catalyst/hour, such as about 7,000 or more gpolymer/gsupported catalyst/hour, such as about 8,000 or more gpolymer/gsupported catalyst/hour, such as about 9,000 or more gpolymer/gsupported catalyst/hour, such as about 10,000 or more gpolymer/gsupported catalyst/hour, such as about 11,000 or more gpolymer/gsupported catalyst/hour, such as about 12,000 or more gpolymer/gsupported catalyst/hour.

An "olefin," alternatively referred to as "alkene," is a linear, branched, or cyclic compound of carbon and hydrogen having at least one double bond. When a polymer or copolymer is referred to as comprising an olefin, the olefin present in such polymer or copolymer is the polymerized form of the olefin. For example, when a copolymer is said to have an ethylene content of 35 wt % to 55 wt %, it is understood that the monomer ("mer") unit in the copolymer is derived from ethylene in the polymerization reaction and the derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of "copolymer," as used herein, includes terpolymers and the like. An oligomer is typically a polymer having a low molecular weight, such an Mn of less than 25,000 g/mol, or less than 2,500 g/mol, or a low number of mer units, such as 75 mer units or less or 50 mer units or less. An "ethylene polymer" or "ethylene copolymer" is a polymer or copolymer comprising at least 50 mole % ethylene derived units, a "propylene polymer" or "propylene copolymer" is a polymer or copolymer comprising at least 50 mole % propylene derived units, and so on.

A "catalyst system" is a combination of at least one catalyst compound and a support material. The catalyst system may have at least one activator and/or at least one co-activator. When catalyst systems are described as comprising neutral stable forms of the components, it is well understood that the ionic form of the component is the form that reacts with the monomers to produce polymers. For purposes of the present disclosure, "catalyst system" includes both neutral and ionic forms of the components of a catalyst system.

As used herein, Mn is number average molecular weight, Mw is weight average molecular weight, and Mz is z average molecular weight, wt % is weight percent, and mol % is mole percent. Molecular weight distribution (MWD), also referred to as polydispersity index (PDI), is defined to be Mw divided by Mn. Unless otherwise noted, all molecular weight units (e.g., Mw, Mn, Mz) are g/mol.

In the present disclosure, the catalyst may be described as a catalyst precursor, a pre-catalyst compound, catalyst compound or a transition metal compound, and these terms are used interchangeably. An "anionic ligand" is a negatively charged ligand which donates one or more pairs of electrons to a metal ion. A "neutral donor ligand" is a neutrally charged ligand which donates one or more pairs of electrons to a metal ion.

For purposes of the present disclosure in relation to catalyst compounds, the term "substituted" means that a hydrogen group has been replaced with a hydrocarbyl group, a heteroatom, or a heteroatom containing group. For example, methylcyclopentadiene (MeCp) is a Cp group substituted with a methyl group.

For purposes of the present disclosure, "alkoxides" include those where the alkyl group is a $C_1$ to $C_{10}$ hydrocarbyl. The alkyl group may be straight chain, branched, or cyclic. The alkyl group may be saturated or unsaturated. In at least one embodiment, the alkyl group may comprise at least one aromatic group. The term "alkoxy" or "alkoxide" preferably means an alkyl ether or aryl ether radical wherein the term alkyl is a $C_1$ to $C_{10}$ alkyl. Examples of suitable alkyl ether radicals include, but are not limited to, methoxy, ethoxy, n-propoxy, iso-propoxy, n-butoxy, iso-butoxy, sec-butoxy, tert-butoxy, phenoxy, and the like.

The present disclosure describes transition metal complexes. The term complex is used to describe molecules in which an ancillary ligand is coordinated to a central transition metal atom. The ligand is stably bonded to the transition metal so as to maintain its influence during use of the catalyst, such as polymerization. The ligand may be coordinated to the transition metal by covalent bond and/or electron donation coordination or intermediate bonds. The transition metal complexes are generally subjected to activation to perform their polymerization function using an activator which is believed to create a cation as a result of the removal of an anionic group, often referred to as a leaving group, from the transition metal.

When used in the present disclosure, the following abbreviations mean: dme is 1,2-dimethoxyethane, Me is methyl, Ph is phenyl, Et is ethyl, Pr is propyl, iPr is isopropyl, n-Pr is normal propyl, cPr is cyclopropyl, Bu is butyl, iBu is isobutyl, tBu is tertiary butyl, p-tBu is tertiary butyl, nBu is normal butyl, sBu is sec-butyl, TMS is trimethylsilyl, TIBAL is triisobutylaluminum, TNOAL is tri(n-octyl)aluminum, MAO is methylalumoxane, SMAO is supported methylalumoxane, Bn is benzyl (i.e., $CH_2Ph$), THF (also referred to as thf) is tetrahydrofuran, RT is room temperature (and is 23° C. unless otherwise indicated), tol is toluene, EtOAc is ethyl acetate, and Cy is cyclohexyl.

The terms "hydrocarbyl radical," "hydrocarbyl," "hydrocarbyl group," "alkyl radical," and "alkyl" are used interchangeably throughout this disclosure. Likewise, the terms "group", "radical", and "substituent" are also used interchangeably in this disclosure. For purposes of this disclosure, "hydrocarbyl radical" is defined to be $C_1$-$C_{100}$ radicals, that may be linear, branched, or cyclic, and when cyclic, aromatic or non-aromatic. Examples of such radicals include, but are not limited to, methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like including their substituted analogues. Substituted hydrocarbyl radicals are radicals in which at least one hydrogen atom of the hydrocarbyl radical has been substituted with at least a non-hydrogen group, such as halogen (such as Br, Cl, F or I) or at least one functional group such as $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$, and the like, or where at least one heteroatom has been inserted within a hydrocarbyl ring.

The term "alkenyl" means a straight-chain, branched-chain, or cyclic hydrocarbon radical having one or more carbon-carbon double bonds. These alkenyl radicals may be substituted. Examples of suitable alkenyl radicals include, but are not limited to, ethenyl, propenyl, allyl, 1,4-butadienyl, cyclopropenyl, cyclobutenyl, cyclopentenyl, cyclohexenyl, cyclooctenyl and the like including their substituted analogues.

The term "aryl" or "aryl group" means a carbon-containing aromatic ring and the substituted variants thereof, including but not limited to, phenyl, 2-methyl-phenyl, xylyl, 4-bromo-xylyl. Likewise, heteroaryl means an aryl group where a ring carbon atom (or two or three ring carbon atoms) has been replaced with a heteroatom, preferably N, O, or S. As used herein, the term "aromatic" also refers to pseudo-aromatic heterocycles which are heterocyclic substituents that have similar properties and structures (nearly planar) to aromatic heterocyclic ligands, but are not by definition aromatic.

"Aromatic" means a hydrocarbyl compound containing a planar unsaturated ring of atoms that is stabilized by interaction of the bonds forming the ring. Such compounds are often six membered rings such as benzene and its derivatives. As used herein, the term "aromatic" also refers to pseudoaromatics which are compounds that have similar properties and structures (nearly planar) to aromatics, but are not by definition aromatic; likewise, the term aromatic also refers to substituted aromatics.

Where isomers of a named alkyl, alkenyl, alkoxide, or aryl group exist (e.g., n-butyl, iso-butyl, sec-butyl, and tert-butyl) reference to one member of the group (e.g., n-butyl) shall expressly disclose the remaining isomers (e.g., iso-butyl, sec-butyl, and tert-butyl) in the family. Likewise, reference to an alkyl, alkenyl, alkoxide, or aryl group without specifying a particular isomer (e.g., butyl) expressly discloses all isomers (e.g., n-butyl, iso-butyl, sec-butyl, and tert-butyl).

The term "ring atom" means an atom that is part of a cyclic ring structure. By this definition, a benzyl group has six ring atoms and tetrahydrofuran has 5 ring atoms. A heterocyclic ring is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring.

"Complex" as used herein, is also often referred to as catalyst precursor, precatalyst, catalyst, catalyst compound, transition metal compound, or transition metal complex. These terms are used interchangeably. Activator and cocatalyst are also used interchangeably.

A scavenger is a compound that may be added to a catalyst system to facilitate polymerization by scavenging impurities. Some scavengers may also act as activators and may be referred to as co-activators. A co-activator, that is not a scavenger, may also be used in conjunction with an activator in order to form an active catalyst system. In at least one embodiment, a co-activator can be pre-mixed with the transition metal compound to form an alkylated transition metal compound.

In the present disclosure, a catalyst may be described as a catalyst precursor, a pre-catalyst compound, catalyst compound or a transition metal compound, and these terms are used interchangeably. A polymerization catalyst system is a catalyst system that can polymerize monomers into polymer.

The term "continuous" means a system that operates without interruption or cessation for a period of time. For example, a continuous process to produce a polymer would be one where the reactants are continually introduced into one or more reactors and polymer product is continually withdrawn.

A bulk polymerization means a polymerization process in which the monomers and/or comonomers being polymerized are used as a solvent or diluent using little or no inert solvent or diluent. A small fraction of inert solvent might be used as a carrier for catalyst and scavenger. A bulk polymerization system contains less than about 25 wt % of inert solvent or diluent, such as less than about 10 wt %, such as less than about 1 wt %, such as 0 wt %.

Support Materials

In at least one embodiment, a catalyst system comprises an inert support material. The support material may be a porous support material, for example, talc, and inorganic oxides. Other support materials include zeolites, clays, organoclays, or any other organic or inorganic support material and the like, or mixtures thereof. The support material may be capable of absorbing water in an amount of at least 0.5 mmol of water per gram of support material.

In at least one embodiment, the support material is an inorganic oxide in a finely divided form. Suitable inorganic oxide materials for use in catalyst systems herein include Groups 2, 4, 13, and 14 metal oxides, such as silica, alumina, and mixtures thereof. Other inorganic oxides that may be used, either alone or in combination, with the silica, or alumina are magnesia, titania, zirconia, and the like. Other suitable support materials, however, can be used, for example, finely divided functionalized polyolefins, such as finely divided polyethylene, polypropylene, and polystyrene with functional groups that are able to absorb water, e.g., oxygen or nitrogen containing groups such as —OH, —RC=O, —OR, and —NR$_2$. Particularly useful supports include magnesia, titania, zirconia, montmorillonite, phyllosilicate, zeolites, talc, clays, silica clay, silicon oxide clay, and the like. Also, combinations of these support materials may be used, for example, silica-chromium, silica-alumina, silica-titania, and the like. In at least one embodiment, the support material is selected from $Al_2O_3$, $ZrO_2$, $SiO_2$, $SiO_2/Al_2O_2$, silica clay, silicon oxide/clay, or mixtures thereof. The support material may be fluorided.

As used herein, the phrases "fluorided support" and "fluorided support composition" mean a support, desirably particulate and porous, which has been treated with at least one inorganic fluorine containing compound. For example, the fluorided support composition can be a silicon dioxide support wherein a portion of the silica hydroxyl groups has been replaced with fluorine or fluorine containing compounds. Suitable fluorine containing compounds include, but are not limited to, inorganic fluorine containing compounds and/or organic fluorine containing compounds.

Fluorine compounds suitable for providing fluorine for the support may be organic or inorganic fluorine compounds and are desirably inorganic fluorine containing compounds. Such inorganic fluorine containing compounds may be any compound containing a fluorine atom as long as it does not contain a carbon atom. Particularly desirable are inorganic fluorine-containing compounds selected from $NH_4BF_4$, $(NH_4)_2SiF_6$, $NH_4PF_6$, $NH_4F$, $(NH_4)_2TaF_7$, $NH_4NbF_4$, $(NH_4)_2GeF_6$, $(NH_4)_2SmF_6$, $(NH_4)_2TiF_6$, $(NH_4)_2ZrF_6$, $MoF_6$, $ReF_6$, $GaF_3$, $SO_2ClF$, $F_2$, $SiF_4$, $SF_6$, $ClF_3$, $ClF_5$, $BrF_5$, $IF_7$, $NF_3$, $HF$, $BF_3$, $NHF_2$, $NH_4HF_2$, and combinations thereof. In at least one embodiment, ammonium hexafluorosilicate and ammonium tetrafluoroborate are used.

In at least one embodiment, the support material comprises a support material treated with an electron-withdrawing anion. The support material can be silica, alumina, silica-alumina, silica-zirconia, alumina-zirconia, aluminum phosphate, heteropolytungstates, titania, magnesia, boria, zinc oxide, mixed oxides thereof, or mixtures thereof; and the electron-withdrawing anion is selected from fluoride, chloride, bromide, phosphate, triflate, bisulfate, sulfate, or any combination thereof.

An electron-withdrawing component can be used to treat the support material. The electron-withdrawing component can be any component that increases the Lewis or Brønsted acidity of the support material upon treatment (as compared to the support material that is not treated with at least one electron-withdrawing anion). In at least one embodiment, the electron-withdrawing component is an electron-withdrawing anion derived from a salt, an acid, or other compound, such as a volatile organic compound, that serves as a source or precursor for that anion. Electron-withdrawing anions can be sulfate, bisulfate, fluoride, chloride, bromide, iodide, fluorosulfate, fluoroborate, phosphate, fluorophosphate, trifluoroacetate, triflate, fluorozirconate, fluorotitanate, phospho-tungstate, or mixtures thereof, or combinations thereof. An electron-withdrawing anion can be fluoride, chloride, bromide, phosphate, triflate, bisulfate, or sulfate, and the like, or any combination thereof, at least one embodiment of this disclosure. In at least one embodiment, the electron-withdrawing anion is sulfate, bisulfate, fluoride, chloride, bromide, iodide, fluorosulfate, fluoroborate, phosphate, fluorophosphate, trifluoroacetate, triflate, fluorozirconate, fluorotitanate, or combinations thereof.

Thus, for example, the support material suitable for use in the catalyst systems of the present disclosure can be one or more of fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, and the like, or combinations thereof. In at least one embodiment, the activator-support can be, or can comprise, fluorided alumina, sulfated alumina, fluorided silica-alumina, sulfated silica-alumina, fluorided silica-coated alumina, sulfated silica-coated alumina, phosphated silica-coated alumina, or combinations thereof. In another embodiment, the support material includes alumina treated with hexafluorotitanic acid, silica-coated alumina treated with hexafluorotitanic acid, silica-alumina treated with hexafluorozirconic acid, silica-alumina treated with trifluoroacetic acid, fluorided boria-alumina, silica treated with tetrafluoroboric acid, alumina treated with tetrafluoroboric acid, alumina treated with hexafluorophosphoric acid, or combinations thereof. Further, any of these activator-supports optionally can be treated with a metal ion.

Nonlimiting examples of cations suitable for use in the present disclosure in the salt of the electron-withdrawing anion include ammonium, trialkyl ammonium, tetraalkyl ammonium, tetraalkyl phosphonium, H+, [H(OEt$_2$)$_2$]+, [HNR$_3$]+(R=C$_1$-C$_{20}$ hydrocarbyl group, which may be the same or different) or combinations thereof.

Further, combinations of one or more different electron-withdrawing anions, in varying proportions, can be used to tailor the specific acidity of the support material to a desired level. Combinations of electron-withdrawing components can be contacted with the support material simultaneously or individually, and in any order that provides a desired chemically-treated support material acidity. For example, in at least one embodiment, two or more electron-withdrawing anion source compounds in two or more separate contacting steps.

An example of a process by which a chemically-treated support material is prepared is as follows: a selected support material, or combination of support materials, can be contacted with a first electron-withdrawing anion source compound to form a first mixture; such first mixture can be calcined and then contacted with a second electron-withdrawing anion source compound to form a second mixture; the second mixture can then be calcined to form a treated support material. In such a process, the first and second electron-withdrawing anion source compounds can be either the same or different compounds.

The method by which the oxide is contacted with the electron-withdrawing component, typically a salt or an acid of an electron-withdrawing anion, can include, but is not limited to, gelling, co-gelling, impregnation of one compound onto another, and the like, or combinations thereof. Following a contacting method, the contacted mixture of the support material, electron-withdrawing anion, and optional metal ion, can be calcined.

According to another embodiment of the present disclosure, the support material can be treated by a process comprising: (i) contacting a support material with a first electron-withdrawing anion source compound to form a first mixture; (ii) calcining the first mixture to produce a calcined first mixture; (iii) contacting the calcined first mixture with a second electron-withdrawing anion source compound to form a second mixture; and (iv) calcining the second mixture to form the treated support material.

It is preferred that the support material, most preferably an inorganic oxide, has a surface area between about 10 and about 800 m$^2$/g (optionally 700 m$^2$/g), pore volume between about 0.1 and about 4.0 cc/g and average particle size between about 5 and about 500 µm. In at least one embodiment, the surface area of the support material is between about 50 and about 500 m$^2$/g, pore volume between about 0.5 and about 3.5 cc/g and average particle size between about 10 and about 200 µm. The surface area of the support material may be between about 100 and about 400 m$^2$/g, pore volume between about 0.8 and about 3.0 cc/g and average particle size between about 5 and about 100 µm. The average pore size of the support material may be between about 10 and about 1000 Å, such as between about 50 and about 500 Å, such as between about 75 and about 350 Å. In at least one embodiment, the support material is an amorphous silica with surface area of 300-400 m$^2$/gm and pore volume of about 0.9 cm$^3$/gm to about 1.8 cm$^3$/gm. In at least one embodiment, the supported material may optionally be a sub-particle containing silica with average sub-particle size of from about 0.05 micron to about 5 microns, e.g., from the spray drying of average particle size of from about 0.05 micron to about 5 microns small particle to form average particle size of from about 5 microns to about 200 microns large main particles. In at least one embodiment of the supported material, at least 20% of the total pore volume (as defined by BET method) has a pore diameter of 100 angstrom or more. Non-limiting example silicas include Grace Davison's 952, 955, and 948; PQ Corporation's ES70 series, PD 14024, PD16042, and PD16043; Asahi Glass Chemical (AGC)'s D70-120A, DM-H302, DM-M302, DM-M402, DM-L302, and DM-L402; Fuji's P-10/20 or P-10/40; and the like.

In embodiments of the present disclosure, the support material will contain some amount of absorbed water. The amount of absorbed water is determined by adding a known amount of water into the support hydrocarbon slurry in a close container and agitate to allow the water to distribute in the pore of the support and/or by a standard thermogravimetric analysis method, e.g., LOD (loss on drying) at the temperature 300° C. for 4 hr. Most commercial support materials will contain some absorbed water and in some cases the amount of absorbed water can be used as an additional active oxygen containing compound. In other cases additional water can be removed, for example, the support material can be dried, and then the required amount of the non-hydrolytic active oxygen-containing compound can be added.

Preferably, the support material is silica, alumina, alumina-silica or a derivative thereof.

Preferably, the support material has an average particle size between 1 and 200 microns, an average pore volume of between 0.05 and 5 mL/g, and a surface area between 50 and 800 m$^2$/g.

Preferably, the support material has been treated with one or more of a Bronsted acid, a Lewis acid, a salt and a Lewis base.

Preferably, the support material comprises a silylating agent.

Preferably, the support material comprises a hydrocarbyl aluminum compound.

Preferably, one or more of the support material comprises an electron withdrawing anion.

Hydrocarbyl Aluminum Compounds

The hydrocarbyl aluminum compounds are preferably alkylaluminium compounds such as a trialkylaluminium compound wherein the alkyl substituents are alkyl groups of up to 10 carbon atoms, such as octyl, isobutyl, ethyl or methyl. Thus, suitable hydrocarbyl aluminum compounds include trimethylaluminum, triethylaluminum, tripropylalumiuum, tri-n-butylaluminum, tri-isobutyl-aluminum, tri(2-methylpentyl)aluminum, trihexylaluminum, tri-n-octylaluminum, and tri-n-decylaluminum. Preferred hydrocarbyl aluminum compounds are trimethylaluminum and tri-n-octylaluminum. Preferred hydrocarbyl aluminum compounds are represented by the formula R$_3$Al wherein each R, which may be the same or different, is independently a hydrocarbon containing between 1 and 30 carbon atoms.

In at least one process of the present disclosure, the amount of hydrocarbyl aluminum compound is from 1.0 mmol aluminum per gram of support material to 30 mmol aluminum per gram of support material. Preferably, however, it is from 2 mmol aluminum per gram of support material to 25 mmol aluminum per gram of support material, such as from 3 mmol aluminum per gram of support material to 20 mmol aluminum per gram of support material.

The hydrocarbyl aluminium compound, in some embodiments of the process, is present in an amount of about 1.5 wt % to 30 wt % aluminium based on the total weight of the reaction mixture, which when using trimethylaluminium corresponds to between about 4 wt % and 54 wt % trimethylaluminium based on the total weight of the reaction mixture. Preferably, the amount of aluminium is between 5 wt % and 25 wt %, more preferably 6 wt % and 20 wt %, based on the total weight of the reaction mixture.

Optionally, the hydrocarbyl aluminum compound includes a non-hydrolytic active oxygen-containing compound.

Preferably, the hydrocarbyl aluminum compound is one or more of trimethylaluminum, triethylaluminum, tripropylalumiuum, tri-n-butylaluminum, tri-isobutyl-aluminum, tri (2-methylpentyl)aluminum, trihexylaluminum, tri-n-octylaluminum, tri-n-decylaluminum, dimethyl aluminum methoxide, dimethyl aluminum ethoxide, dimethyl aluminum isopropoxide, dimethyl aluminum n-butoxide, dimethyl aluminum isobutoxide, diethyl aluminum methoxide, diethyl aluminum ethoxide, diethyl aluminum isopropoxide, diethyl aluminum n-butoxide, diethyl aluminum isobutoxide, diisobutyl aluminum methoxide, diisobutyl aluminum ethoxide, diisobutyl aluminum isopropoxide, diisobutyl aluminum n-butoxide, diisobutyl aluminum isobutoxide, di-n-hexyl aluminum methoxide, di-n-hexyl aluminum ethoxide, di-n-hexyl aluminum isopropoxide, di-n-hexyl aluminum n-butoxide, di-n-hexyl aluminum isobutoxide, methyl aluminum dimethoxide, methyl aluminum diethoxide, methyl aluminum diisopropoxide, methyl aluminum di-n-butoxide, methyl aluminum diisobutoxide, ethyl aluminum dimethoxide, ethyl aluminum diethoxide, ethyl aluminum diisopropoxide, ethyl aluminum di-n-butoxide, ethyl aluminum diisobtutoxide, isobutyl aluminum dimethoxide, isobutyl aluminum diethoxide, isobutyl aluminum diisopropoxide, isobutyl aluminum di-n-butoxide, isobutyl aluminum diisobutoxide, n-hexylaluminum dimethoxide, n-hexyl aluminum diethoxide, n-hexyl aluminum diisopropoxide, n-hexyl aluminum di-n-butoxide, n-hexyl aluminum diisobutoxide, aluminum trimethoxide, aluminum triethoxide, aluminum triisopropoxide, aluminum tri-n-butoxide, tetramethyldialuminumdiiso-propoxide, tetramethyldialuminumdi-tert-butoxide tetramethyldialuminumditert-butoxide, pentamethyldialuminumtert-butoxide and aluminum tri-isobutoxide.

Preferably, the hydrocarbyl aluminum compound is one or more of trimethylaluminum, triethylaluminum and dimethyl aluminum isobutoxide.

Preferably, the hydrocarbyl aluminum compound is selected from a combination of trimethyl aluminum and trioctylaluminum, and a combination of trimethyl aluminum and triisobutyl aluminum.

Preferably, the hydrocarbyl aluminum compound comprises trimethyl aluminum.

Preferably, the hydrocarbyl aluminum compound includes a mixture comprising an alumoxane.

Active Oxygen-Containing Compound

Suitable oxygen-containing compounds are any non-hydrolitic oxygen-containing compounds in which one or more oxygen atoms is able to react with the hydrocarbly aluminum compound to form a new Al—O bond, with or without heat. The non-hydrolitic active oxygen-containing compound can be one or more hydroxy or carbonyl containing compounds for example an alcohol or a carboxylic acid. In at least one embodiment of the present disclosure, the non-hydrolitic active oxygen-containing compound is one or more of carbon dioxide, a carboxylic acid, a ketone, an aldehyde, an ester, an anhydride, an alcohol or combination thereof. In at least one embodiment, the non-hydrolitic active oxygen-containing compound may contain additional water.

In at least one embodiment of the present disclosure, the non-hydrolytic active oxygen-containing compound is represented by the formula $R^1R^2C=CR^3CO_2H$ wherein each of $R^1$ and $R^2$ is independently hydrogen, alkyl, alkenyl, aryl or heteroatom containing group and $R^3$ is alkyl, alkenyl, aryl or heteroatom containing group.

In at least one embodiment of the present disclosure, the hydrocarbyl aluminum compound includes the non-hydrolytic active oxygen-containing compound. Examples of hydrocarbyl aluminum compounds which include an non-hydrolytic active oxygen-containing compound include dimethyl aluminum methoxide, dimethyl aluminum ethoxide, dimethyl aluminum isopropoxide, dimethyl aluminum n-butoxide, dimethyl aluminum isobutoxide, pentamethyldialuminum-t-butoxide, tetramethyldialuminumdi-t-butoxide, pentamethyldialuminum-i-propoxide, tetramethyldialuminumdi-i-propoxide, diethyl aluminum methoxide, diethyl aluminum ethoxide, diethyl aluminum isopropoxide, diethyl aluminum n-butoxide, diethyl aluminum isobutoxide, diisobutyl aluminum methoxide, diisobutyl aluminum ethoxide, diisobutyl aluminum isopropoxide, diisobutyl aluminum n-butoxide, diisobutyl aluminum isobutoxide, di-n-hexyl aluminum methoxide, di-n-hexyl aluminum ethoxide, di-n-hexyl aluminum isopropoxide, di-n-hexyl aluminum n-butoxide, di-n-hexyl aluminum isobutoxide, methyl aluminum dimethoxide, methyl aluminum diethoxide, methyl aluminum diisopropoxide, methyl aluminum di-n-butoxide, methyl aluminum diisobutoxide, ethyl aluminum dimethoxide, ethyl aluminum diethoxide, ethyl aluminum diisopropoxide, ethyl aluminum di-n-butoxide, ethyl aluminum diisobutoxide, isobutyl aluminum dimethoxide, isobutyl aluminum diethoxide, isobutyl aluminum diisopropoxide, isobutyl aluminum di-n-butoxide, isobutyl aluminum diisobutoxide, n-hexylaluminum dimethoxide, n-hexyl aluminum diethoxide, n-hexyl aluminum diisopropoxide, n-hexyl aluminum di-n-butoxide, n-hexyl aluminum diisobutoxide, aluminum trimethoxide, aluminum triethoxide, aluminum triisopropoxide, aluminum tri-n-butoxide, and aluminum triisobutoxide.

Some oxygen containing compounds cannot react with hydrocarbyl aluminum compounds even at a temperature where the hydrocarbyl aluminum compound starts to decompose, e.g., at 200° C. and are therefore excluded for use to make in-situ supported aluminoxane. Examples are polymeric compounds such as $Al_2O_3$, $MgO$, $Na_2O$, $Mg(OH)_2$, $Al(OH)_3$, and the like.

The starting charging molar ratio of Al:O, wherein O is the active oxygen in the non-hydrolitic active oxygen containing compound, can be 100:1, 60:1, 30:1, 10:1, 1:1, or 0.9:1 to form the desired supported aluminoxane compositions with or without excess free hydrocarbyl aluminum compounds. If undesired excess hydrocarbyl aluminum compound(s) is (are) present, it (they) can be removed, for example, by filtration and then washed with an aliphatic solvent.

Preferably the non-hydrolytic active oxygen-containing compound is one or more of carbon dioxide, a carboxylic acid, an ester, an anhydride, an alcohol or combination thereof.

Preferably the non-hydrolytic active oxygen-containing compound is one or more of carbon dioxide, a carboxylic acid, an ester, an anhydride and an alcohol or combination thereof, optionally containing water.

Preferably the non-hydrolytic active oxygen-containing compound is $R^1R^2C=CR^3CO_2H$ wherein each of $R^1$ and $R^2$ is independently hydrogen, alkyl, alkenyl, aryl or heteroatom containing group and $R^3$ is alkyl, alkenyl, aryl or heteroatom containing group.

Preferably the non-hydrolytic active oxygen-containing compound is methacrylic acid.

Supported Alumoxanes

The supported alumoxanes of the present disclosure are prepared in-situ by contacting the hydocarbyl aluminum compound with a non-hydrolytic active oxygen-containing compound in an aliphatic solvent, at a temperature of from less than 0° C. to −60° C., such as from −10° C. to −50° C., preferably from −15° C. to −30° C. followed by addition of the support material. Where the hydrocarbyl aluminum compound includes the non-hydrolytic active oxygen-containing compound, the silica slurry is added directly to a solution of the aluminum/non-hydrolytic active oxygen-containing compound at a temperature of from −80° C. to 200° C., such as from −60° C. to 100° C., preferably at a temperature of from 0° C. to 50° C. For example, a silica slurry is added slowly to the hydrocarbyl aluminum/non-hydrolytic active oxygen-containing compound solution at a temperature of from −80° C. to 200° C., such as from −60° C. to 100° C., preferably at a temperature of from 0° C. to 50° C., such as from 10° C. to 40° C., so that the internal temperature of the reactor is maintained in a desired range, e.g., within 40, 30, 20, 10 or 5° C.

Suitable solvents are materials in which all of the reactants used herein, e.g., the support and the hydrocarbyl aluminum, are at least partially soluble and which are liquid at reaction temperatures. Non-limiting example solvents are non-cyclic alkanes with formula $C_nH_{(n+2)}$ where n=4 to 30, such as isobutene, butane, isopentane, hexane, n-heptane, octane, nonane, decane and the like, cycloalkanes with formula $C_nH_n$ where n=5 to 30, such as cyclopentane, methylcyclopentane, cyclohexane, methylcyclohexane and the like, and mixtures thereof.

Optional Heat Treatment of the Supported Alumoxanes

The supported alumoxanes of the present disclosure, after being prepared in-situ, can be further treated at a higher temperature for a certain period of time either in the form of an aliphatic solvent slurry or a solid. The high temperature treatment can be from about 60° C. to about 200° C., preferably, about 70° C. to about 140° C., and more preferably about 80° C. to about 120° C. The reaction mixture after contacting the support material having absorbed water and the hydrocarbyl aluminum compound in an aliphatic solvent at a low temperature can also be spray dried in a spray drying reactor at a higher temperature to evaporize the solvents/volatiles and form the solid product with a desired average particle size and particle size distribution. The preferred temperature range is from about 60° C. to about 200° C., more preferred is about 80° C. to about 190° C., and the most preferred is about 90° C. to about 160° C.

Catalyst Compounds

In at least one embodiment, the present disclosure provides a catalyst system comprising a catalyst compound having a metal atom. The catalyst compound can be a metallocene catalyst compound. The metal can be a Group 3 through Group 12 metal atom, such as Group 3 through Group 10 metal atoms, or lanthanide Group atoms. The catalyst compound having a Group 3 through Group 12 metal atom can be monodentate or multidentate, such as bidentate, tridentate, or tetradentate, where a heteroatom of the catalyst, such as phosphorous, oxygen, nitrogen, or sulfur is chelated to the metal atom of the catalyst. Non-limiting examples include bis(phenolate)s. In at least one embodiment, the Group 3 through Group 12 metal atom is selected from Group 5, Group 6, Group 8, or Group 10 metal atoms. In at least one embodiment, a Group 3 through Group 10 metal atom is selected from Cr, Sc, Ti, Zr, Hf, V, Nb, Ta, Mn, Re, Fe, Ru, Os, Co, Rh, Ir, and Ni. In at least one embodiment, a metal atom is selected from Groups 4, 5, and 6 metal atoms. In at least one embodiment, a metal atom is a Group 4 metal atom selected from Ti, Zr, or Hf. The oxidation state of the metal atom can range from 0 to +7, for example +1, +2, +3, +4, or +5, for example +2, +3 or +4.

A catalyst compound of the present disclosure can be a chromium or chromium-based catalyst. Chromium-based catalysts include chromium oxide ($CrO_3$) and silylchromate catalysts. Chromium catalysts have been the subject of much development in the area of continuous fluidized-bed gas-phase polymerization for the production of polyethylene polymers. Such catalysts and polymerization processes have been described, for example, in U.S. Publication No. 2011/0010938 and U.S. Pat. Nos. 7,915,357; 8,129,484; 7,202,313; 6,833,417; 6,841,630; 6,989,344; 7,504,463; 7,563,851; 8,420,754; and 8,101,691.

Metallocene catalyst compounds as used herein include metallocenes comprising Group 3 to Group 12 metal complexes, preferably, Group 4 to Group 6 metal complexes, for example, Group 4 metal complexes. The metallocene catalyst compound of catalyst systems of the present disclosure may be unbridged metallocene catalyst compounds represented by the formula: $Cp^A Cp^B M'X'_n$, wherein each $Cp^A$ and $Cp^B$ is independently selected from cyclopentadienyl ligands and ligands isolobal to cyclopentadienyl, one or both $Cp^A$ and $Cp^B$ may contain heteroatoms, and one or both $Cp^A$ and $Cp^B$ may be substituted by one or more R" groups. M' is selected from Groups 3 through 12 atoms and lanthanide Group atoms. X' is an anionic leaving group. n is 0 or an integer from 1 to 4. R" is selected from alkyl, lower alkyl, substituted alkyl, heteroalkyl, alkenyl, lower alkenyl, substituted alkenyl, heteroalkenyl, alkynyl, lower alkynyl, substituted alkynyl, heteroalkynyl, alkoxy, lower alkoxy, aryloxy, alkylthio, lower alkylthio, arylthio, aryl, substituted aryl, heteroaryl, aralkyl, aralkylene, alkaryl, alkarylene, haloalkyl, haloalkenyl, haloalkynyl, heteroalkyl, heterocycle, heteroaryl, a heteroatom-containing group, hydrocarbyl, lower hydrocarbyl, substituted hydrocarbyl, heterohydrocarbyl, silyl, boryl, phosphino, phosphine, amino, amine, ether, and thioether. In at least one embodiment, each $Cp^A$ and $Cp^B$ is independently selected from cyclopentadienyl, indenyl, fluorenyl, cyclopentaphenanthreneyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, and hydrogenated versions thereof. The metallocene catalyst compound may be a bridged metallocene catalyst compound represented by the formula: $Cp^A(A)Cp^B M'X'_n$, wherein each $Cp^A$ and $Cp^B$ is independently selected from cyclopentadienyl ligands and ligands isolobal to cyclopentadienyl. One or both $Cp^A$ and $Cp^B$ may contain heteroatoms, and one or both $Cp^A$ and $Cp^B$ may be substituted by one or more R" groups. M' is selected from Groups 3 through 12 atoms and lanthanide Group atoms. X' is an anionic leaving group. n is 0 or an integer from 1 to 4. (A) is selected from divalent alkyl, divalent lower alkyl, divalent substituted alkyl, divalent heteroalkyl, divalent alkenyl, divalent lower alkenyl, divalent substituted alkenyl, divalent heteroalkenyl, divalent alkynyl, divalent lower alkynyl, divalent substituted alkynyl, divalent heteroalkynyl, divalent alkoxy, divalent lower alkoxy, divalent aryloxy, divalent alkylthio, divalent lower alkylthio, divalent arylthio, divalent aryl, divalent substituted aryl, divalent heteroaryl, divalent aralkyl, divalent aralkylene, divalent alkaryl, divalent alkarylene, divalent haloalkyl, divalent haloalkenyl, divalent haloalkynyl, divalent heteroalkyl, divalent heterocycle, divalent heteroaryl, a divalent heteroatom-containing group, divalent hydrocarbyl, divalent lower hydrocarbyl, divalent substituted hydrocarbyl, divalent heterohydrocarbyl, divalent silyl, divalent boryl, divalent phosphino, divalent phosphine, divalent amino, divalent amine, divalent ether, divalent thioether. R" is selected from alkyl, lower alkyl, substituted alkyl, heteroalkyl, alkenyl, lower alkenyl, substituted alkenyl, heteroalkenyl, alkynyl, lower alkynyl, substituted alkynyl, heteroalkynyl, alkoxy, lower alkoxy, aryloxy, alkylthio, lower alkylthio, arylthio, aryl, substituted aryl, heteroaryl, aralkyl, aralkylene, alkaryl, alkarylene, haloalkyl, haloalkenyl, haloalkynyl, heteroalkyl, heterocycle, heteroaryl, a heteroatom-containing group, hydrocarbyl, lower hydrocarbyl, substituted hydrocarbyl, heterohydrocarbyl, silyl, boryl, phosphino, phosphine, amino, amine, germanium, ether, and thioether.

In at least one embodiment, each of $Cp^A$ and $Cp^B$ is independently selected from cyclopentadienyl, n-propylcyclopentadienyl, indenyl, pentamethylcyclopentadienyl, tetramethylcyclopentadienyl, and n-butylcyclopentadienyl. (A) may be O, S, NR', or SiR'$_2$, where each R' is independently hydrogen or $C_1$-$C_{20}$ hydrocarbyl.

In another embodiment, the metallocene catalyst compound is represented by the formula:

$$T_yCp_mMG_nX_q,$$

where Cp is independently a substituted or unsubstituted cyclopentadienyl ligand or substituted or unsubstituted ligand isolobal to cyclopentadienyl such as indenyl, fluorenyl and indacenyl. M is a Group 4 transition metal, such as Hf, Ti, or Zr. G is a heteroatom group represented by the formula $JR^*_z$ where J is N, P, O or S, and R* is a linear, branched, or cyclic $C_1$-$C_{20}$ hydrocarbyl. z is 1 or 2. T is a bridging group. y is 0 or 1. X is a leaving group. m=1, n=1, 2 or 3, q=0, 1, 2 or 3, and the sum of m+n+q is equal to the oxidation state of the transition metal, preferably 2, 3 or 4, preferably 4.

In at least one embodiment, J is N, and R* is methyl, ethyl, propyl, butyl, pentyl, hexyl, heptyl, octyl, nonyl, cyclooctyl, cyclododecyl, decyl, undecyl, dodecyl, adamantyl or an isomer thereof. Preferred $JR^*_z$ groups include t-butyl amido and cyclododecylamido.

Preferred examples for the bridging group T include $CH_2$, $CH_2CH_2$, $SiMe_2$, $SiPh_2$, $SiMePh$, $Si(CH_2)_3$, $Si(CH_2)_4$, O, S, NPh, PPh, NMe, PMe, NEt, NPr, NBu, PEt, PPr, $Me_2SiOSiMe_2$, and PBu. In a preferred embodiment of the invention in any embodiment of any formula described herein, T is represented by the formula $ER^d_2$ or $(ER^d_2)_2$, where E is C, Si, or Ge, and each $R^d$ is, independently, hydrogen, halogen, $C_1$ to $C_{20}$ hydrocarbyl (such as methyl, ethyl, propyl, butyl, pentyl, hexyl, heptyl, octyl, nonyl, decyl, undecyl, or dodecyl) or a $C_1$ to $C_{20}$ substituted hydrocarbyl, and two $R^d$ can form a cyclic structure including aromatic, partially saturated, or saturated cyclic or fused ring system.

Each X is independently selected from the group consisting of hydrocarbyl radicals having from 1 to 20 carbon atoms, aryls, hydrides, amides, alkoxides, sulfides, phosphides, halides, dienes, amines, phosphines, ethers, and a combination thereof, (two Xs may form a part of a fused ring or a ring system), preferably each X is independently selected from halides, aryls and $C_1$ to $C_5$ alkyl groups, preferably each X is a phenyl, methyl, ethyl, propyl, butyl, pentyl, or chloro group.

The metallocene catalyst compound may be selected from: bis(1-methyl, 3-n-butyl cyclopentadienyl) zirconium dichloride; dimethylsilyl bis(tetrahydroindenyl) zirconium dichloride; bis(n-propylcyclopentadienyl) hafnium dimethyl; dimethylsilyl (tetramethylcyclopentadienyl)(cyclododecylamido)titanium dimethyl; dimethylsilyl (tetramethylcyclopentadienyl)(cyclododecylamido)titanium dichloride; dimethylsilyl (tetramethylcyclopentadienyl)(t-butylamido) titanium dimethyl; dimethylsilyl (tetramethylcyclopentadienyl)(t-butylamido)titanium dichloride; $\mu$-$(CH_3)_2$Si(cyclopentadienyl)(1-adamantylamido)M(R)$_2$; $\mu$-$(CH_3)_2$Si(3-tertbutylcyclopentadienyl)(1-adamantylamido)M(R)$_2$; $\mu$-$(CH_3)_2$(tetramethylcyclopentadienyl)(1-adamantylamido) M(R)$_2$; $\mu$-$(CH_3)_2$Si(tetramethylcyclopentadienyl)(1-adamantylamido)M(R)$_2$; $\mu$-$(CH_3)_2$C(tetramethylcyclopentadienyl)(1-adamantylamido)M(R)$_2$; $\mu$-$(CH_3)_2$Si (tetramethylcyclopentadienyl)(1-tertbutylamido)M(R)$_2$; $\mu$-$(CH_3)_2$Si(fluorenyl)(1-tertbutylamido)M(R)$_2$; $\mu$-$(CH_3)_2$Si (tetramethylcyclopentadienyl)(1-cyclododecylamido)M (R)$_2$; $\mu$-$(C_6H_5)_2$C(tetramethylcyclopentadienyl)(1-cyclododecylamido)M(R)$_2$; $\mu$-$(CH_3)_2$Si($\eta^5$-2,6,6-trimethyl-1,5,6,7-tetrahydro-s-indacen-1-yl)(tertbutylamido)M(R)$_2$; where M is selected from Ti, Zr, and Hf; and each R is selected from halogen or $C_1$ to $C_5$ alkyl (preferably chloro, bromo, methyl, ethyl, propyl, butyl, pentyl or isomers thereof).

In at least one embodiment, the catalyst compound is a bis(phenolate) catalyst compound represented by Formula (I):

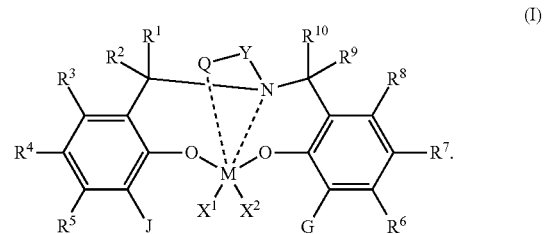

M is a Group 4 metal, such as Hf or Zr. $X^1$ and $X^2$ are independently a univalent $C_1$-$C_{20}$ hydrocarbyl, $C_1$-$C_{20}$ substituted hydrocarbyl, a heteroatom or a heteroatom-containing group, or $X^1$ and $X^2$ join together to form a $C_4$-$C_{62}$ cyclic or polycyclic ring structure. Each $R^1$, $R^2$, $R^3$, $R^4$, $R^5$, $R^6$, $R^7$, R, $R^9$, and $R^{10}$ is independently hydrogen, $C_1$-$C_{40}$ hydrocarbyl, $C_1$-$C_{40}$ substituted hydrocarbyl, a heteroatom or a heteroatom-containing group, or two or more of $R^1$, $R^2$, $R^3$, $R^4$, $R^5$, $R^6$, $R^7$, $R^8$, $R^9$, or $R^{10}$ are joined together to form a $C_4$-$C_{62}$ cyclic or polycyclic ring structure, or a combination thereof. Q is a neutral donor group. J is heterocycle, a substituted or unsubstituted $C_7$-$C_{60}$ fused polycyclic group, where at least one ring is aromatic and where at least one ring, which may or may not be aromatic, has at least five ring atoms. G is as defined for J or may be hydrogen, $C_2$-$C_{60}$ hydrocarbyl, $C_1$-$C_{60}$ substituted hydrocarbyl, or may independently form a $C_4$-$C_{60}$ cyclic or polycyclic ring structure with $R^6$, $R^7$, or $R^8$ or a combination thereof. Y is divalent $C_1$-$C_{20}$ hydrocarbyl or divalent $C_1$-$C_{20}$ substituted hydrocarbyl or (-Q*-Y—) together form a heterocycle. Heterocycle may be aromatic and/or may have multiple fused rings.

In at least one embodiment, the catalyst compound represented by Formula (I) is:

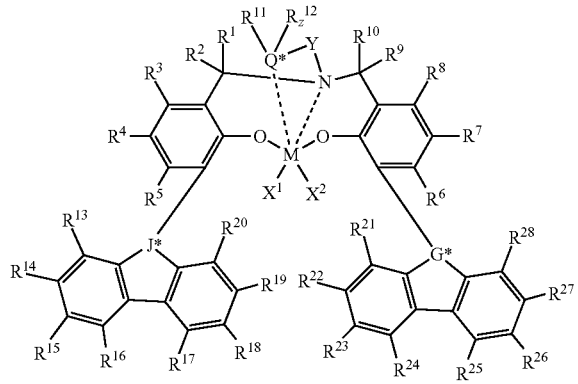

(II)

or

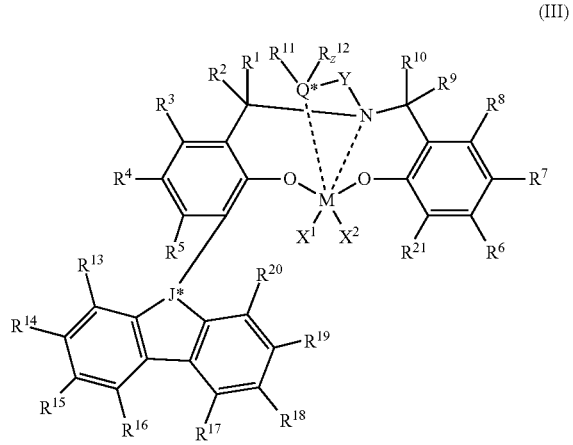

(III)

M is Hf, Zr, or Ti. $X^1$, $X^2$, $R^1$, $R^2$, $R^3$, $R^4$, $R^5$, $R^6$, $R^7$, $R^8$, $R^9$, $R^{10}$, and Y are as defined for Formula (I). $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ is independently a hydrogen, $C_1$-$C_{40}$ hydrocarbyl, $C_1$-$C_{40}$ substituted hydrocarbyl, a functional group comprising elements from Groups 13 to 17, or two or more of $R^1$, $R^2$, $R^3$, $R^4$, $R^5$, $R^6$, $R^7$, $R^8$, $R^9$, $R^{10}$ $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ may independently join together to form a $C_4$-$C_{62}$ cyclic or polycyclic ring structure, or a combination thereof. $R^{11}$ and $R^{12}$ may join together to form a five- to eight-membered heterocycle. Q* is a group 15 or 16 atom. z is 0 or 1. J* is CR" or N, and G* is CR" or N, where R" is $C_1$-$C_{20}$ hydrocarbyl or carbonyl-containing $C_1$-$C_{20}$ hydrocarbyl. z=0 if Q* is a group 16 atom, and z=1 if Q* is a group 15 atom.

In at least one embodiment the catalyst is an iron complex represented by formula (IV):

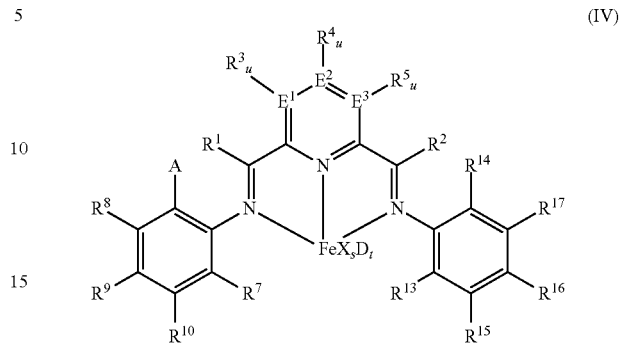

(IV)

wherein:
A is chlorine, bromine, iodine, —$CF_3$ or —$OR^{11}$,
each of $R^1$ and $R^2$ is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or five-, six- or seven-membered heterocyclyl comprising at least one atom selected from the group consisting of N, P, O and S;
wherein each of $R^1$ and $R^2$ is optionally substituted by halogen, —$NR^{11}_2$, —$OR^{11}$ or —$SiR^{12}_3$;
wherein $R^1$ optionally bonds with $R^3$, and $R^2$ optionally bonds with $R^5$, in each case to independently form a five-, six- or seven-membered ring;
$R^7$ is a $C_1$-$C_{20}$ alkyl;
each of $R^3$, $R^4$, $R^5$, $R^8$, $R^9$, $R^{10}$, $R^{15}$, $R^{16}$, and $R^{17}$ is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, —$NR^{11}_2$, —$OR^{11}$, halogen, —$SiR^{12}_3$ or five-, six- or seven-membered heterocyclyl comprising at least one atom selected from the group consisting of N, P, O and S;
wherein $R^3$, $R^4$, $R^5$, $R^7$, $R^8$, $R^9$, $R^{10}$, $R^{15}$, $R^{16}$, and $R^{17}$ are optionally substituted by halogen, —$NR^{11}_2$, —$OR^{11}$ or —$SiR^{12}_3$;
wherein $R^3$ optionally bonds with $R^4$, $R^4$ optionally bonds with $R^5$, $R^7$ optionally bonds with $R^{10}$, $R^{10}$ optionally bonds with $R^9$, $R^9$ optionally bonds with $R^8$, $R^{17}$ optionally bonds with $R^{16}$, and $R^{16}$ optionally bonds with $R^{15}$, in each case to independently form a five-, six- or seven-membered carbocyclic or heterocyclic ring, the heterocyclic ring comprising at least one atom from the group consisting of N, P, O and S;
$R^{13}$ is $C_1$-$C_{20}$-alkyl bonded with the aryl ring via a primary or secondary carbon atom,
$R^{14}$ is chlorine, bromine, iodine, —$CF_3$ or —$OR^{11}$, or $C_1$-$C_{20}$-alkyl bonded with the aryl ring;
each $R^{11}$ is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or —$SiR^{12}_3$, wherein $R^{11}$ is optionally substituted by halogen, or two $R^{11}$ radicals optionally bond to form a five- or six-membered ring;
each $R^{12}$ is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or two $R^{12}$ radicals optionally bond to form a five- or six-membered ring, each of $E^1$, $E^2$, and $E^3$ is independently carbon, nitrogen or phosphorus;

each u is independently 0 if $E^1$, $E^2$, and $E^3$ is nitrogen or phosphorus and is 1 if $E^1$, $E^2$, and $E^3$ is carbon, each X is independently fluorine, chlorine, bromine, iodine, hydrogen, $C_1$-$C_{20}$-alkyl, $C_2$-$C_{10}$-alkenyl, $C_6$-$C_{20}$-aryl, arylalkyl where alkyl has from 1 to 10 carbon atoms and aryl has from 6 to 20 carbon atoms, —$NR^{18}_2$, —$OR^{18}$, —$SR^{18}$, —$SO_3R^{18}$, —$OC(O)R^{18}$, —CN, —SCN, β-diketonate, —CO, —$BF_4^-$, —$PF_6^-$ or bulky non-coordinating anions, and the radicals X can be bonded with one another;

each $R^{18}$ is independently hydrogen, $C_1$-$C_{20}$-alkyl, $C_2$-$C_{20}$-alkenyl, $C_6$-$C_{20}$-aryl, arylalkyl where alkyl has from 1 to 10 carbon atoms and aryl has from 6 to 20 carbon atoms, or —$SiR^{19}_3$, wherein $R^{18}$ can be substituted by halogen or nitrogen- or oxygen-containing groups and two $R^{18}$ radicals optionally bond to form a five- or six-membered ring;

each $R^{19}$ is independently hydrogen, $C_1$-$C_{20}$-alkyl, $C_2$-$C_{20}$-alkenyl, $C_6$-$C_{20}$-aryl or arylalkyl where alkyl has from 1 to 10 carbon atoms and aryl has from 6 to 20 carbon atoms, wherein $R^{19}$ can be substituted by halogen or nitrogen- or oxygen-containing groups or two $R^{19}$ radicals optionally bond to form a five- or six-membered ring;

s is 1, 2, or 3,

D is a neutral donor, and t is 0 to 2.

In at least one embodiment, the catalyst is a quinolinyldiamido transition metal complex represented by formulas (V) and (VI):

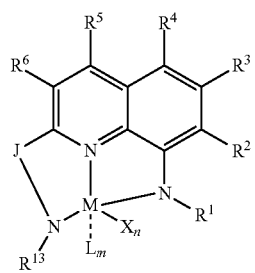

(V)

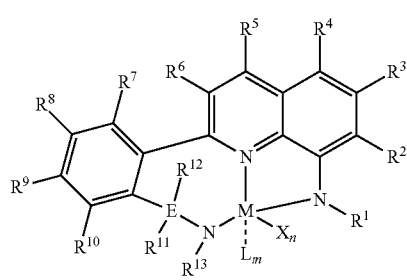

(VI)

wherein:

M is a Group 3-12 metal, such as a group 4 metal, such as Hf, Ti or Zr;

J is a three-atom-length bridge between the quinoline and the amido nitrogen;

E is selected from carbon, silicon, or germanium;

X is an anionic leaving group;

L is a neutral Lewis base;

$R^1$ and $R^{13}$ are independently selected from the group consisting of hydrocarbyls, substituted hydrocarbyls, and silyl groups;

$R^2$ through $R^{12}$ are independently selected from the group consisting of hydrogen, hydrocarbyls, alkoxy, silyl, amino, aryloxy, substituted hydrocarbyls, halogen, and phosphino;

n is 1 or 2;

m is 0, 1, or 2 n+m is not greater than 4; and any two adjacent R groups (e.g. $R^1$ & $R^2$, $R^2$ & $R^3$, etc.) may be joined to form a substituted or unsubstituted hydrocarbyl or heterocyclic ring, where the ring has 5, 6, 7, or 8 ring atoms and where substitutions on the ring can join to form additional rings;

any two X groups may be joined together to form a dianionic group;

any two L groups may be joined together to form a bidentate Lewis base;

an X group may be joined to an L group to form a monoanionic bidentate group.

In a preferred embodiment M is a Group 4 metal, zirconium or hafnium.

In a preferred embodiment J is an arylmethyl, dihydro-1H-indenyl, or tetrahydronaphthalenyl group.

In a preferred embodiment E is carbon.

In a preferred embodiment X is alkyl, aryl, hydride, alkylsilane, fluoride, chloride, bromide, iodide, triflate, carboxylate, or alkylsulfonate.

In a preferred embodiment L is an ether, amine or thio-ether.

In a preferred embodiment, $R^7$ and $R^8$ are joined to form a six membered aromatic ring with the joined $R^7$ and $R^8$ groups being —CH=CHCH=CH—.

In a preferred embodiment $R^{10}$ and $R^{11}$ are joined to form a five membered ring with the joined $R^{10}$ and $R^{11}$ groups being —$CH_2CH_2$—.

In a preferred embodiment, $R^{10}$ and $R^{11}$ are joined to form a six membered ring with the joined $R^{10}$ and $R^{11}$ groups being —$CH_2CH_2CH_2$—.

In a preferred embodiment, $R^1$ and $R^{13}$ may be independently selected from phenyl groups that are variously substituted with between zero to five substituents that include F, Cl, Br, I, $CF_3$, $NO_2$, alkoxy, dialkylamino, aryl, and alkyl groups having 1 to 10 carbons, such as methyl, ethyl, propyl, butyl, pentyl, hexyl, heptyl, octyl, nonyl, decyl, and isomers thereof.

In another embodiment, the catalyst is a phenoxyimine compound represented by the formula (VII):

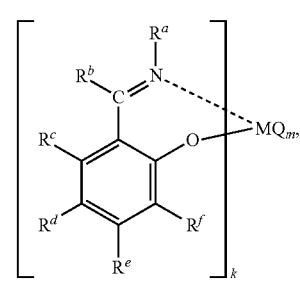

(VII)

wherein M represents a transition metal atom selected from the groups 3 to 11 metals in the periodic table; k is an integer of 1 to 6; m is an integer of 1 to 6; $R^a$ to $R^f$ may be the same or different from one another and each represent a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group or a tin-containing group, among which 2 or more groups may be bound to each other to form a ring; when k is 2 or more, $R^a$ groups, $R^b$ groups, $R^c$ groups, $R^d$ groups, $R^e$ groups, or $R^f$ groups may be the same or different from one another, one group of $R^a$ to $R^f$ contained in one ligand and one group of $R^a$ to $R^f$ contained in another ligand may form a linking group or a single bond, and a heteroatom contained in $R^a$ to $R^f$ may coordinate with or bind to M; m is a number satisfying the valence of M; Q represents a hydrogen atom, a halogen atom, an oxygen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group; when m is 2 or more, a plurality of groups represented by Q may be the same or different from one another, and a plurality of groups represented by Q may be mutually bound to form a ring.

In another embodiment, the catalyst is a bis(imino)pyridyl of the formula (VIII):

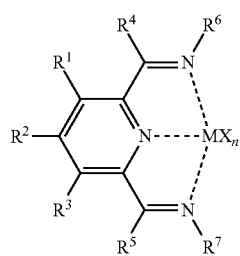

(VIII)

wherein:

M is Co or Fe; each X is an anion; n is 1, 2 or 3, so that the total number of negative charges on said anion or anions is equal to the oxidation state of a Fe or Co atom present in (VIII);

$R^1$, $R^2$ and $R^3$ are each independently hydrogen, hydrocarbyl, substituted hydrocarbyl, or an inert functional group;

$R^4$ and $R^5$ are each independently hydrogen, hydrocarbyl, an inert functional group or substituted hydrocarbyl;

$R^6$ is formula IX:

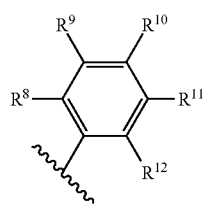

(IX)

and $R^7$ is formula X:

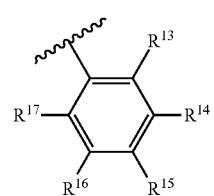

(X)

$R^8$ and $R^{13}$ are each independently hydrocarbyl, substituted hydrocarbyl or an inert functional group;

$R^9$, $R^{10}$, $R^{11}$, $R^{14}$, $R^{15}$ and $R^{16}$ are each independently hydrogen, hydrocarbyl, substituted hydrocarbyl or an inert functional group;

$R^{12}$ and $R^{17}$ are each independently hydrogen, hydrocarbyl, substituted hydrocarbyl or an inert functional group;

and provided that any two of $R^8$, $R^9$, $R^{10}$, $R^{11}$, $R^{12}$, $R^{13}$, $R^{14}$, $R^{15}$, $R^{16}$ and $R^{17}$ that are adjacent to one another, together may form a ring.

In at least one embodiment, the catalyst compound is represented by the formula (XI):

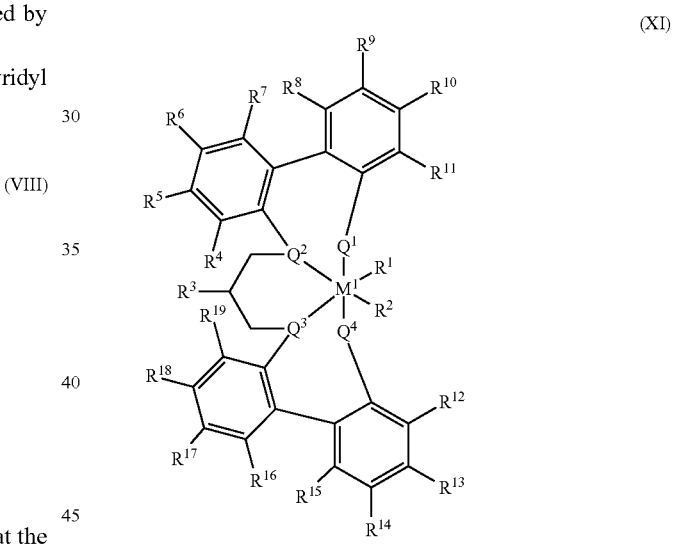

(XI)

$M^1$ is selected from the group consisting of titanium, zirconium, hafnium, vanadium, niobium, tantalum, chromium, molybdenum and tungsten. In at least one embodiment, $M^1$ is zirconium.

Each of $Q^1$, $Q^2$, $Q^3$, and $Q^4$ is independently oxygen or sulfur. In at least one embodiment, at least one of $Q^1$, $Q^2$, $Q^3$, and $Q^4$ is oxygen, alternately all of $Q^1$, $Q^2$, $Q^3$, and $Q^4$ are oxygen.

$R^1$ and $R^2$ are independently hydrogen, halogen, hydroxyl, hydrocarbyl, or substituted hydrocarbyl (such as $C_1$-$C_{10}$ alkyl, $C_1$-$C_{10}$ alkoxy, $C_6$-$C_{20}$ aryl, $C_6$-$C_{10}$ aryloxy, $C_2$-$C_{10}$ alkenyl, $C_2$-$C_{40}$ alkenyl, $C_7$-$C_{40}$ arylalkyl, $C_7$-$C_{40}$ alkylaryl, $C_8$-$C_{40}$ arylalkenyl, or conjugated diene which is optionally substituted with one or more hydrocarbyl, tri(hydrocarbyl) silyl or tri(hydrocarbyl) silylhydrocarbyl, the diene having up to 30 atoms other than hydrogen). $R^1$ and $R^2$ can be a halogen selected from fluorine, chlorine, bromine, or iodine. Preferably, $R^1$ and $R^2$ are chlorine.

Alternatively, $R^1$ and $R^2$ may also be joined together to form an alkanediyl group or a conjugated $C_4$-$C_{40}$ diene ligand which is coordinated to $M^1$. $R^1$ and $R^2$ may also be identical or different conjugated dienes, optionally substituted with one or more hydrocarbyl, tri(hydrocarbyl) silyl or tri(hydrocarbyl) silylhydrocarbyl, the dienes having up to 30 atoms not counting hydrogen and/or forming a π-complex with $M^1$.

Exemplary groups suitable for $R^1$ and or $R^2$ can include 1,4-diphenyl, 1,3-butadiene, 1,3-pentadiene, 2-methyl 1,3-pentadiene, 2,4-hexadiene, 1-phenyl, 1,3-pentadiene, 1,4-dibenzyl, 1,3-butadiene, 1,4-ditolyl-1,3-butadiene, 1,4-bis(trimethylsilyl)-1,3-butadiene, and 1,4-dinaphthyl-1,3-butadiene. $R^1$ and $R^2$ can be identical and are $C_1$-$C_3$ alkyl or alkoxy, $C_6$-$C_{10}$ aryl or aryloxy, $C_2$-$C_4$ alkenyl, $C_7$-$C_{10}$ arylalkyl, $C_7$-$C_{12}$ alkylaryl, or halogen.

Each of $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, and $R^{19}$ is independently hydrogen, halogen, $C_1$-$C_{40}$ hydrocarbyl or $C_1$-$C_{40}$ substituted hydrocarbyl (such as $C_1$-$C_{10}$ alkyl, $C_1$-$C_{10}$ alkoxy, $C_6$-$C_{20}$ aryl, $C_6$-$C_{10}$ aryloxy, $C_2$-$C_{10}$ alkenyl, $C_2$-$C_{40}$ alkenyl, $C_7$-$C_{40}$ arylalkyl, $C_7$-$C_{40}$ alkylaryl, $C_8$-$C_{40}$ arylalkenyl, or conjugated diene which is optionally substituted with one or more hydrocarbyl, tri(hydrocarbyl) silyl or tri(hydrocarbyl) silylhydrocarbyl, the diene having up to 30 atoms other than hydrogen), —$NR'_2$, —$SR'$, —$OR$, $OSiR'_3$, —$PR'_2$, where each R' is hydrogen, halogen, $C_1$-$C_{10}$ alkyl, or $C_6$-$C_{10}$ aryl, or one or more of $R^4$ and $R^5$, $R^5$ and $R^6$, $R^6$ and $R^7$, $R^8$ and $R^9$, $R^9$ and $R^{10}$, $R^{10}$ and $R^{11}$, $R^{12}$ and $R^{13}$, $R^{13}$ and $R^{14}$, $R^{14}$ and $R^{15}$, $R^{16}$ and $R^{17}$, $R^{17}$ and $R^{18}$, and $R^{18}$ and $R^{19}$ are joined to form a saturated ring, unsaturated ring, substituted saturated ring, or substituted unsaturated ring. In at least one embodiment, $C_1$-$C_{40}$ hydrocarbyl is selected from methyl, ethyl, propyl, n-propyl, isopropyl, n-butyl, isobutyl, sec-butyl, n-pentyl, isopentyl, sec-pentyl, n-hexyl, isohexyl, sec-hexyl, n-heptyl, isoheptyl, sec-heptyl, n-octyl, isooctyl, sec-octyl, n-nonyl, isononyl, sec-nonyl, n-decyl, isodecyl, and sec-decyl.

Preferably, $R^{11}$ and $R^{12}$ are $C_6$-$C_{10}$ aryl such as phenyl or naphthyl optionally substituted with $C_1$-$C_{40}$ hydrocarbyl, such as $C_1$-$C_{10}$ hydrocarbyl. Preferably, $R^6$ and $R^{17}$ are $C_{1-40}$ alkyl, such as $C_1$-$C_{10}$ alkyl.

In at least one embodiment, each of $R^4$, $R^5$, $R^6$, $R^7$, $R^8$, $R^9$, $R^{10}$, $R^{13}$, $R^{14}$, $R^{15}$, $R^{16}$, $R^{17}$, $R^{18}$, and $R^{19}$ is independently hydrogen or $C_1$-$C_{40}$ hydrocarbyl. In at least one embodiment, $C_1$-$C_{40}$ hydrocarbyl is selected from methyl, ethyl, propyl, n-propyl, isopropyl, n-butyl, isobutyl, sec-butyl, n-pentyl, isopentyl, sec-pentyl, n-hexyl, isohexyl, sec-hexyl, n-heptyl, isoheptyl, sec-heptyl, n-octyl, isooctyl, sec-octyl, n-nonyl, isononyl, sec-nonyl, n-decyl, isodecyl, and sec-decyl. Preferably, each of $R^6$ and $R^{17}$ is $C_1$-$C_{40}$ hydrocarbyl and $R^4$, $R^5$, $R^7$, $R^8$, $R^9$, $R^{10}$, $R^{13}$, $R^{14}$, $R^{15}$, $R^{16}$, $R^{18}$, and $R^{19}$ is hydrogen. In at least one embodiment, $C_1$-$C_{40}$ hydrocarbyl is selected from methyl, ethyl, propyl, n-propyl, isopropyl, n-butyl, isobutyl, sec-butyl, n-pentyl, isopentyl, sec-pentyl, n-hexyl, isohexyl, sec-hexyl, n-heptyl, isoheptyl, sec-heptyl, n-octyl, isooctyl, sec-octyl, n-nonyl, isononyl, sec-nonyl, n-decyl, isodecyl, and sec-decyl.

$R^3$ is a $C_1$-$C_{40}$ unsaturated alkyl or substituted $C_1$-$C_{40}$ unsaturated alkyl (such as $C_1$-$C_{10}$ alkyl, $C_1$-$C_{10}$ alkoxy, $C_6$-$C_{20}$ aryl, $C_6$-$C_{10}$ aryloxy, $C_2$-$C_{10}$ alkenyl, $C_2$-$C_{40}$ alkenyl, $C_7$-$C_{40}$ arylalkyl, $C_7$-$C_{40}$ alkylaryl, $C_8$-$C_{40}$ arylalkenyl, or conjugated diene which is optionally substituted with one or more hydrocarbyl, tri(hydrocarbyl) silyl or tri(hydrocarbyl) silylhydrocarbyl, the diene having up to 30 atoms other than hydrogen).

Preferably, $R^3$ is a hydrocarbyl comprising a vinyl moiety. As used herein, "vinyl" and "vinyl moiety" are used interchangeably and include a terminal alkene, e.g. represented by the structure

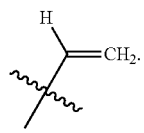

Hydrocarbyl of $R^3$ may be further substituted (such as $C_1$-$C_{10}$ alkyl, $C_1$-$C_{10}$ alkoxy, $C_6$-$C_{20}$ aryl, $C_6$-$C_{10}$ aryloxy, $C_2$-$C_{10}$ alkenyl, $C_2$-$C_{40}$ alkenyl, $C_7$-$C_{40}$ arylalkyl, $C_7$-$C_{40}$ alkylaryl, $C_8$-$C_{40}$ arylalkenyl, or conjugated diene which is optionally substituted with one or more hydrocarbyl, tri(hydrocarbyl) silyl or tri(hydrocarbyl) silylhydrocarbyl, the diene having up to 30 atoms other than hydrogen). Preferably, $R^3$ is $C_1$-$C_{40}$ unsaturated alkyl that is vinyl or substituted $C_1$-$C_{40}$ unsaturated alkyl that is vinyl. $R^3$ can be represented by the structure —R'CH=$CH_2$ where R' is $C_1$-$C_{40}$ hydrocarbyl or $C_1$-$C_{40}$ substituted hydrocarbyl (such as $C_1$-$C_{10}$ alkyl, $C_1$-$C_{10}$ alkoxy, $C_6$-$C_{20}$ aryl, $C_6$-$C_{10}$ aryloxy, $C_2$-$C_{10}$ alkenyl, $C_2$-$C_{40}$ alkenyl, $C_7$-$C_{40}$ arylalkyl, $C_7$-$C_{40}$ alkylaryl, $C_8$-$C_{40}$ arylalkenyl, or conjugated diene which is optionally substituted with one or more hydrocarbyl, tri(hydrocarbyl) silyl or tri(hydrocarbyl) silylhydrocarbyl, the diene having up to 30 atoms other than hydrogen). In at least one embodiment, $C_1$-$C_{40}$ hydrocarbyl is selected from methyl, ethyl, propyl, n-propyl, isopropyl, n-butyl, isobutyl, sec-butyl, n-pentyl, isopentyl, sec-pentyl, n-hexyl, isohexyl, sec-hexyl, n-heptyl, isoheptyl, sec-heptyl, n-octyl, isooctyl, sec-octyl, n-nonyl, isononyl, sec-nonyl, n-decyl, isodecyl, and sec-decyl.

In at least one embodiment, $R^3$ is 1-propenyl, 1-butenyl, 1-pentenyl, 1-hexenyl, 1-heptenyl, 1-octenyl, 1-nonenyl, or 1-decenyl.

In at least one embodiment, the catalyst is a Group 15-containing metal compound represented by Formulas (XII) or (XIII):

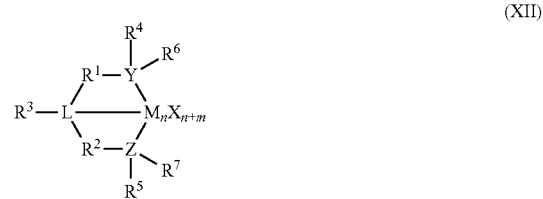

wherein M is a Group 3 to 12 transition metal or a Group 13 or 14 main group metal, a Group 4, 5, or 6 metal. In many embodiments, M is a Group 4 metal, such as zirconium, titanium, or hafnium. Each X is independently a leaving group, such as an anionic leaving group. The leaving group may include a hydrogen, a hydrocarbyl group, a heteroatom, a halogen, or an alkyl; y is 0 or 1 (when y is 0 group L' is absent). The term 'n' is the oxidation state of M. In various embodiments, n is +3, +4, or +5. In many embodiments, n is +4. The term 'm' represents the formal charge of the YZL or the YZL' ligand, and is 0, −1, −2 or −3 in various embodiments. In many embodiments, m is −2. L is a Group 15 or 16 element, such as nitrogen or oxygen; L' is a Group 15 or 16 element or Group 14 containing group, such as carbon, silicon or germanium. Y is a Group 15 element, such as nitrogen or phosphorus. In many embodiments, Y is nitrogen. Z is a Group 15 element, such as nitrogen or phosphorus. In many embodiments, Z is nitrogen. $R^1$ and $R^2$ are, independently, a $C_1$ to $C_{20}$ hydrocarbon group, a heteroatom containing group having up to twenty carbon atoms, silicon, germanium, tin, lead, or phosphorus. In many embodiments, $R^1$ and $R^2$ are a $C_2$ to $C_{20}$ alkyl, aryl or aralkyl group, such as a $C_2$ to $C_{20}$ linear, branched or cyclic alkyl group, or a $C_2$ to $C_{20}$ hydrocarbon group. $R^1$ and $R^2$ may also be interconnected to each other. $R^3$ may be absent or may be a hydrocarbon group, a hydrogen, a halogen, a heteroatom containing group. In many embodiments, $R^3$ is absent, for example, if L is an oxygen, or a hydrogen, or a linear, cyclic, or branched alkyl group having 1 to 20 carbon atoms. $R^4$ and $R^5$ are independently an alkyl group, an aryl group, substituted aryl group, a cyclic alkyl group, a substituted cyclic alkyl group, a cyclic aralkyl group, a substituted cyclic aralkyl group, or multiple ring system, often having up to 20 carbon atoms. In many embodiments, $R^4$ and $R^5$ have between 3 and 10 carbon atoms, or are a $C_1$ to $C_{20}$ hydrocarbon group, a $C_1$ to $C_{20}$ aryl group or a $C_1$ to $C_{20}$ aralkyl group, or a heteroatom containing group. $R^4$ and $R^5$ may be interconnected to each other. $R^6$ and $R^7$ are independently absent, hydrogen, an alkyl group, halogen, heteroatom, or a hydrocarbyl group, such as a linear, cyclic or branched alkyl group having 1 to 20 carbon atoms. In many embodiments, $R^6$ and $R^7$ are absent. R* may be absent, or may be a hydrogen, a Group 14 atom containing group, a halogen, or a heteroatom containing group.

By "formal charge of the YZL or YZL' ligand," it is meant the charge of the entire ligand absent the metal and the leaving groups X. By "$R^1$ and $R^2$ may also be interconnected" it is meant that $R^1$ and $R^2$ may be directly bound to each other or may be bound to each other through other groups. By "$R^4$ and $R^5$ may also be interconnected" it is meant that $R^4$ and $R^5$ may be directly bound to each other or may be bound to each other through other groups. An alkyl group may be linear, branched alkyl radicals, alkenyl radicals, alkynyl radicals, cycloalkyl radicals, aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. An aralkyl group is defined to be a substituted aryl group.

In one or more embodiments, R4 and R5 are independently a group represented by the following structure (XIV):

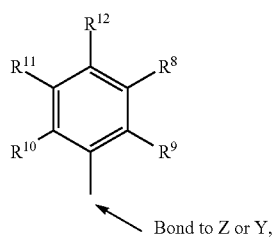

Bond to Z or Y, wherein $R^8$ to $R^{12}$ are each independently hydrogen, a $C_1$ to $C_{40}$ alkyl group, a halide, a heteroatom, a heteroatom containing group containing up to 40 carbon atoms. In many embodiments, $R^8$ to $R^{12}$ are a $C_1$ to $C_{20}$ linear or branched alkyl group, such as a methyl, ethyl, propyl, or butyl group. Any two of the R groups may form a cyclic group and/or a heterocyclic group. The cyclic groups may be aromatic. In one embodiment $R^9$, $R^{10}$ and $R^{12}$ are independently a methyl, ethyl, propyl, or butyl group (including all isomers). In another embodiment, $R^9$, $R^{10}$ and $R^{12}$ are methyl groups, and $R^8$ and $R^{11}$ are hydrogen.

In one or more embodiments, $R^4$ and $R^5$ are both a group represented by the following structure (XV):

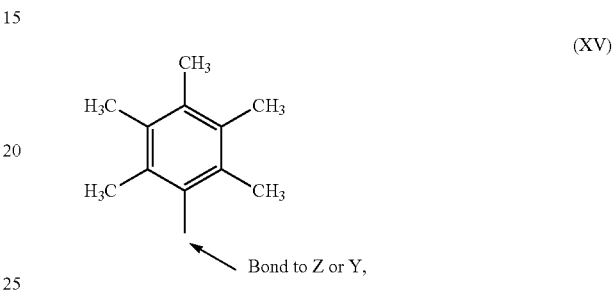

Bond to Z or Y, wherein M is a Group 4 metal, such as zirconium, titanium, or hafnium. In many embodiments, M is zirconium. Each of L, Y, and Z may be a nitrogen. Each of $R^1$ and $R^2$ may be —$CH_2$—$CH_2$—. $R^3$ may be hydrogen, and $R^6$ and $R^7$ may be absent.

In some embodiments, the maximum amount of alumoxane is up to a 5000-fold molar excess Al/M over the catalyst compound (per metal catalytic site). The minimum alumoxane-to-catalyst-compound is a 1:1 molar ratio. Alternate preferred ranges include from 1:1 to 500:1, alternately from 1:1 to 200:1, alternately from 1:1 to 100:1, or alternately from 1:1 to 50:1.

Catalyst System Formation

Embodiments of the present disclosure include methods for preparing a catalyst system including contacting in an aliphatic solvent the supported alumoxane with at least one catalyst compound having a Group 3 through Group 12 metal atom or lanthanide metal atom. The catalyst compound having a Group 3 through Group 12 metal atom or lanthanide metal atom can be a metallocene catalyst compound comprising a Group 4 metal.

In at least one embodiment, the supported alumoxane is heated prior to contact with the catalyst compound.

The supported alumoxane can be slurried in an aliphatic solvent and the resulting slurry is contacted with a solution of at least one catalyst compound. The catalyst compound can also be added as a solid to the slurry of the aliphatic solvent and the supported alumoxane. In at least one embodiment, the slurry of the supported alumoxane is contacted with the catalyst compound for a period of time between about 0.02 hours and about 24 hours, such as between about 0.1 hours and 1 hour, 0.2 hours and 0.6 hours, 2 hours and about 16 hours, or between about 4 hours and about 8 hours.

The mixture of the catalyst compound and the supported alumoxane may be heated to between about 0° C. and about 70° C., such as between about 23° C. and about 60° C., for example room temperature. Contact times may be between about 0.02 hours and about 24 hours, such as between about 0.1 hours and 1 hour, 0.2 hours and 0.6 hours, 2 hours and about 16 hours, or between about 4 hours and about 8 hours.

Suitable aliphatic solvents are materials in which some or all of the reactants used herein, e.g., the supported alumoxane and the catalyst compound, are at least partially soluble (or in the case of the solid support, suspended) and which are liquid at reaction temperatures. Non-limiting example solvents are non-cyclic alkanes with formula $C_nH_{(n+2)}$ where n is 4 to 30, such as isobutane, butane, isopentane, hexane, n-heptane, octane, nonane, decane and the like, and cycloalkanes with formula $C_nH_n$ where n is 5 to 30, such as cyclopentane, methylcyclopentane, cyclohexane, methylcyclohexane and the like. Suitable aliphatic solvents also include mixtures of any of the above.

The solvent can be charged into a reactor, followed by a supported alumoxane. Catalyst can then be charged into the reactor, such as a solution of catalyst in an aliphatic solvent or as a solid. The mixture can be stirred at a temperature, such as room temperature. Additional solvent may be added to the mixture to form a slurry having a desired consistency, such as from about 2 cc/g of silica to about 20 cc/g silica, such as about 4 cc/g. The solvent is then removed. Removing solvent dries the mixture and may be performed under a vacuum atmosphere, purged with inert atmosphere, heating of the mixture, or combinations thereof. For heating of the mixture, any suitable temperature can be used that evaporates the aliphatic solvent. It is to be understood that reduced pressure under vacuum will lower the boiling point of the aliphatic solvent depending on the pressure of the reactor. Solvent removal temperatures can be from about 10° C. to about 200° C., such as from about 60° C. to about 140° C., such as from about 60° C. to about 120° C., for example about 80° C. or less, such as about 70° C. or less. In at least one embodiment, removing solvent includes applying heat, applying vacuum, and applying nitrogen purged from bottom of the vessel by bubbling nitrogen through the mixture. The mixture is dried.

Polymerization Processes

In at least one embodiment of the present disclosure, a method includes polymerizing olefins to produce a polyolefin composition by contacting at least one olefin with a catalyst system of the present disclosure and obtaining the polyolefin composition. Polymerization may be conducted at a temperature of from about 0° C. to about 300° C., at a pressure of from about 0.35 MPa to about 10 MPa, and/or at a time up to about 400 minutes.

Embodiments of the present disclosure include polymerization processes where monomer (such as ethylene or propylene), and optionally comonomer, are contacted with a catalyst system comprising at least one catalyst compound and an activator, as described above. The catalyst system components (catalyst compound, activator, etc.) may be combined in any order, and are combined typically prior to contact with the monomer.

Slurry and gas phase polymerizations may be conducted in the presence of an aliphatic hydrocarbon solvent/diluent/condensing agent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; preferably aromatics are present in the solvent/diluent/condensing agent at less than 1 wt %, preferably less than 0.5 wt %, preferably at 0 wt % based upon the weight of the solvents/diluent/condensing agent).

In preferred embodiments, solvents/diluents used in the polymerizations are not aromatic, preferably aromatics are present in the solvent/diluent at less than 1 wt %, preferably less than 0.5 wt %, preferably less than 0 wt % based upon the weight of the solvents/diluents.

Monomers useful herein include substituted or unsubstituted $C_2$ to $C_{40}$ alpha olefins, preferably $C_2$ to $C_{20}$ alpha olefins, preferably $C_2$ to $C_{12}$ alpha olefins, preferably ethylene, propylene, butene, pentene, hexene, heptene, octene, nonene, decene, undecene, dodecene and isomers thereof. In a preferred embodiment, olefins include a monomer that is propylene and one or more optional comonomers comprising one or more ethylene or $C_4$ to $C_{40}$ olefin, preferably $C_4$ to $C_{20}$ olefin, or preferably $C_6$ to $C_{12}$ olefin. The $C_4$ to $C_{40}$ olefin monomers may be linear, branched, or cyclic. The $C_4$ to $C_{40}$ cyclic olefin may be strained or unstrained, monocyclic or polycyclic, and may include one or more heteroatoms and/or one or more functional groups. In another preferred embodiment, olefins include a monomer that is ethylene and an optional comonomer comprising one or more of $C_3$ to $C_{40}$ olefin, preferably $C_4$ to $C_{20}$ olefin, or preferably $C_6$ to $C_{12}$ olefin. The $C_3$ to $C_{40}$ olefin monomers may be linear, branched, or cyclic. The $C_3$ to $C_{40}$ cyclic olefins may be strained or unstrained, monocyclic or polycyclic, and may include heteroatoms and/or one or more functional groups.

Exemplary $C_2$ to $C_{40}$ olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and substituted derivatives thereof, preferably norbornene, norbornadiene, and dicyclopentadiene.

In at least one embodiment, one or more dienes are present in a polymer produced herein at up to about 10 wt %, such as from about 0.00001 to about 1.0 wt %, such as from about 0.002 to about 0.5 wt %, such as from about 0.003 to about 0.2 wt %, based upon the total weight of the composition. In at least one embodiment, about 500 ppm or less of diene is added to the polymerization, such as about 400 ppm or less, such as about 300 ppm or less. In at least one embodiment, at least about 50 ppm of diene is added to the polymerization, or about 100 ppm or more, or 150 ppm or more.

Diolefin monomers include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e., di-vinyl monomers). In at least one embodiment, the diolefin monomers are linear di-vinyl monomers, such as those containing from 4 to 30 carbon atoms. Non-limiting examples of dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Non-limiting example cyclic dienes include cyclopentadiene, vinylnorbornene, norbornadiene, ethylidene norbornene, divinylbenzene, dicyclopentadiene or higher ring containing diolefins with or without substituents at various ring positions.

In at least one embodiment, where butene is the comonomer, the butene source may be a mixed butene stream comprising various isomers of butene. The 1-butene monomers are expected to be preferentially consumed by the polymerization process as compared to other butene monomers. Use of such mixed butene streams will provide an economic benefit, as these mixed streams are often waste streams from refining processes, for example, $C_4$ raffinate streams, and can therefore be substantially less expensive than pure 1-butene.

Polymerization processes of the present disclosure can be carried out in any suitable slurry or gas phase polymerization process. Such processes can be run in a batch, semi-batch, or continuous mode.

Preferred polymerizations can be run at any temperature and/or pressure suitable to obtain the desired polyolefins. Typical temperatures and/or pressures include a temperature from about 0° C. to about 300° C., such as from about 20° C. to about 200° C., such as from about 35° C. to about 150° C., such as from about 40° C. to about 120° C., such as from about 65° C. to about 95° C.; and at a pressure from about 0.35 MPa to about 10 MPa, such as from about 0.45 MPa to about 6 MPa, or preferably from about 0.5 MPa to about 4 MPa.

In a typical polymerization, the run time of the reaction is up to about 400 minutes, such as from about 5 to about 250 minutes, such as from about 10 to about 120 minutes.

Hydrogen, may be added to a reactor for molecular weight control of polyolefins. In at least one embodiment, hydrogen is present in the polymerization reactor at a partial pressure of from about 0.001 and 50 psig (0.007 to 345 kPa), such as from about 0.01 to about 25 psig (0.07 to 172 kPa), such as from about 0.1 and 10 psig (0.7 to 70 kPa). In at least one embodiment, 600 ppm or less of hydrogen is added, or 500 ppm or less of hydrogen is added, or 400 ppm or less or 300 ppm or less. In other embodiments, at least 50 ppm of hydrogen is added, or 100 ppm or more, or 150 ppm or more.

In an alternative embodiment, the activity of the catalyst is at least about 50 g/mmol/hour, such as about 500 or more g/mmol/hour, such as about 5,000 or more g/mmol/hr, such as about 750,000 or more g/mmol/hr where the amount of metallocene catalyst is in the denominator. In an alternative embodiment, the conversion of olefin monomer is at least about 10%, based upon polymer yield (weight) and the weight of the monomer entering the reaction zone, such as about 20% or more, such as about 30% or more, such as about 50% or more, such as about 80% or more.

Preferably, alumoxane is present at a molar ratio of aluminum to transition metal of a catalyst compound of less than about 500:1, such as less than about 300:1, such as less than about 100:1, such as less than about 1:1.

In a preferred embodiment, little or no scavenger is used in the process to produce the polyolefin composition. Preferably, scavenger (such as tri alkyl aluminum) is present at zero mol %. Alternatively, the scavenger is present at a molar ratio of scavenger metal to transition metal of the catalyst of less than about 100:1, such as less than about 50:1, such as less than about 15:1, such as less than about 10:1.

In a preferred embodiment, the polymerization: 1) is conducted at temperatures of 0° C. to 300° C. (preferably 25° C. to 150° C., preferably 40° C. to 120° C., preferably 65° C. to 95° C.); 2) is conducted at a pressure of atmospheric pressure to 10 MPa (preferably 0.35 to 10 MPa, preferably from 0.45 to 6 MPa, preferably from 0.5 to 4 MPa); (3) wherein the catalyst system used in the polymerization comprises alumoxane at a molar ratio of aluminum to transition metal of a catalyst compound of from 75 to 160, such as from 90 to 150, for example 95 to 125; 4) the polymerization preferably occurs in one reaction zone; 5) the productivity of the catalyst compound is at least such as about 6,000 or more gpolymer/gsupported catalyst/hour, such as about 7,000 or more gpolymer/gsupported catalyst/hour, such as about 8,000 or more gpolymer/gsupported catalyst/hour, such as about 9,000 or more gpolymer/gsupported catalyst/hour, such as about 10,000 or more gpolymer/gsupported catalyst/hour, such as about 11,000 or more gpolymer/gsupported catalyst/hour, such as about 12,000 or more gpolymer/gsupported catalyst/hour; 6) optionally scavengers (such as trialkyl aluminum compounds) are absent (e.g., present at zero mol %). 7) Alternatively, the scavenger is present at a molar ratio of scavenger metal to transition metal of less than 100:1, preferably less than 50:1, preferably less than 15:1, preferably less than 10:1; and 8) optionally hydrogen is present in the polymerization reactor at a partial pressure of 0.001 to 50 psig (0.007 to 345 kPa) (preferably from 0.01 to 25 psig (0.07 to 172 kPa), more preferably 0.1 to 10 psig (0.7 to 70 kPa)). In a preferred embodiment, the catalyst system used in the polymerization comprises no more than one catalyst compound. A "reaction zone", also referred to as a "polymerization zone", is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. The polymerization can occur in one or more reaction zones.

Other additives may also be used in the polymerization, as desired, such as one or more scavengers, promoters, modifiers, chain transfer agents (such as diethyl zinc), reducing agents, oxidizing agents, hydrogen, aluminum alkyls, or silanes.

Chain transfer agents may be alkylalumoxanes, a compound represented by the formula $AlR_3$, $ZnR_2$ (where each R is, independently, a $C_1$-$C_8$ aliphatic radical, preferably methyl, ethyl, propyl, butyl, penyl, hexyl, heptyl, octyl or an isomer thereof) or a combination thereof, such as diethyl zinc, methylalumoxane, trimethylaluminum, triisobutylaluminum, trioctylaluminum, or a combination thereof.

Gas Phase Polymerization:

Gas phase polymerization processes may be used herein. Generally, in a fluidized gas bed process used for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See, for example, U.S. Pat. Nos. 4,543,399; 4,588,790; 5,028,670; 5,317,036; 5,352,749; 5,405,922; 5,436,304; 5,453,471; 5,462,999; 5,616,661; and 5,668,228, all of which are fully incorporated herein by reference.)

Slurry Phase Polymerization:

Slurry phase polymerization processes may be used herein. A slurry polymerization process generally operates between 1 to about 50 atmosphere pressure range (15 psi to 735 psi, 103 kPa to 5068 kPa) or even greater and temperatures of from about 0° C. to about 120° C. In a slurry polymerization, a suspension of solid, particulate polymer is formed in a liquid polymerization diluent medium to which monomer and comonomers, along with catalysts, are added. The suspension including diluent is intermittently or continuously removed from the reactor where the volatile components are separated from the polymer and recycled, optionally after a distillation, to the reactor. The liquid diluent used in the polymerization medium is typically an alkane having from 3 to 7 carbon atoms, preferably a branched alkane. The medium used should be liquid under the conditions of polymerization and relatively inert. When a propane medium is used, the process should be operated above the reaction diluent critical temperature and pressure. Preferably, a hexane or an isobutane medium is used. In another embodiment, the diluent is not aromatic, preferably aromatics are present in the diluent at less than 1 wt %, preferably less than 0.5 wt %, preferably less than 0 wt % based upon the weight of the diluents.

Polyolefin Products

The present disclosure also relates to polyolefin compositions, such as resins, produced by the catalyst systems of the present disclosure. Polyolefins of the present disclosure can have no detectable aromatic solvent, as determined by Gas Phase Chromatography.

In at least one embodiment, a process includes utilizing a catalyst system of the present disclosure to produce propylene homopolymers or propylene copolymers, such as propylene-ethylene and/or propylene-alphaolefin (preferably $C_3$ to $C_{20}$) copolymers (such as propylene-hexene copolymers or propylene-octene copolymers) having an Mw/Mn of greater than about 1, such as greater than about 2, such as greater than about 3, such as greater than about 4.

In at least one embodiment, a process includes utilizing a catalyst system of the present disclosure to produce olefin polymers, preferably polyethylene and polypropylene homopolymers and copolymers. In at least one embodiment, the polymers produced herein are homopolymers of ethylene or copolymers of ethylene preferably having from about 0 and 25 mole % of one or more $C_3$ to $C_{20}$ olefin comonomer (such as from about 0.5 and 20 mole %, such as from about 1 to about 15 mole %, such as from about 3 to about 10 mole %). Olefin comonomers may be $C_3$ to $C_{12}$ alpha-olefins, such as one or more of propylene, butene, hexene, octene, decene, or dodecene, preferably propylene, butene, hexene, or octene. Olefin monomers may be one or more of ethylene or $C_4$ to $C_{12}$ alpha-olefin, preferably ethylene, butene, hexene, octene, decene, or dodecene, preferably ethylene, butene, hexene, or octene.

Polymers produced herein may have an Mw of from about 5,000 to about 1,000,000 g/mol (such as from about 25,000 to about 750,000 g/mol, such as from about 50,000 to about 500,000 g/mol), and/or an Mw/Mn of from about 1 to about 40 (such as from about 1.2 to about 20, such as from about 1.3 to about 10, such as from about 1.4 to about 5, such as from about 1.5 to about 4, such as from about 1.5 to about 3) as determined by GPC-4D as described in the Test Methods section below.

The polyolefins produced herein contain 0 ppm of aromatic hydrocarbon. Preferably, the polyolefins produced herein contain 0 ppm of toluene.

Blends

In at least one embodiment, the polymer (such as polyethylene or polypropylene) produced herein and having no detectable aromatic solvent is combined with one or more additional polymers prior to being formed into a film, molded part or other article. Other useful polymers, which may or may not contain a detectable amount of aromatic solvent, include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In at least one embodiment, the polymer (such as polyethylene or polypropylene) is present in the above blends, at from about 10 to about 99 wt %, based upon the weight of total polymers in the blend, such as from about 20 to about 95 wt %, such as from about 30 to about 90 wt %, such as from about 40 to about 90 wt %, such as from about 50 to about 90 wt %, such as from about 60 to about 90 wt %, such as from about 70 to about 90 wt %.

Blends of the present disclosure may be produced by mixing the polymers of the present disclosure with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

Blends of the present disclosure may be formed using conventional equipment and methods, such as by dry blending the individual components, such as polymers, and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; mixtures thereof, and the like.

In at least one embodiment, a polyolefin composition, such as a resin, that is a multi-modal polyolefin composition comprises a low molecular weight fraction and/or a high molecular weight fraction.

In at least one embodiment, the polyolefin composition produced by a catalyst system of the present disclosure has a comonomer content from about 3 wt % to about 15 wt %, such as from about 4 wt % and bout 10 wt %, such as from about 5 wt % to about 8 wt %. In at least one embodiment, the polyolefin composition produced by a catalyst system of the present disclosure has a polydispersity index of from about 2 to about 6, such as from about 2 to about 5.

Films

Any of the foregoing polymers, such as the foregoing polyethylenes or blends thereof, may be used in a variety of end-use applications. Such applications include, for example, mono- or multi-layer blown, extruded, and/or shrink films. These films may be formed by any suitable extrusion or coextrusion techniques, such as a blown bubble film processing technique, where the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxially orientation can be accomplished using typical cold drawing or hot drawing methods. Biaxial orientation can be accomplished using tenter frame equipment or a double bubble process and may occur before or after the individual layers are brought together. For example, a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. Typically the films are oriented in the Machine Direction (MD) at a ratio of up to 15, preferably between 5 and 7, and in the Transverse Direction (TD) at a ratio of up to 15, preferably 7 to 9. However, in another embodiment, the film is oriented to the same extent in both the MD and TD directions.

The films may vary in thickness depending on the intended application; however, films of a thickness from 1 m to 50 m may be suitable. Films intended for packaging are usually from 10 μm to 50 μm thick. The thickness of the sealing layer is typically 0.2 μm to 50 μm. There may be a sealing layer on both the inner and outer surfaces of the film or the sealing layer may be present on only the inner or the outer surface.

In another embodiment, one or more layers may be modified by corona treatment, electron beam irradiation, gamma irradiation, flame treatment, or microwave. In a preferred embodiment, one or both of the surface layers is modified by corona treatment.

Test Methods

GPC-4D Procedure: Molecular Weight and Comonomer Composition Determination by GPC-IR Hyphenated with Multiple Detectors Unless otherwise indicated, the distribution and the moments of molecular weight (Mw, Mn, Mw/Mn, etc.), the comonomer content ($C_2$, $C_3$, $C_6$, etc.) are determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10-μm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1-μm Teflon filter and degassed with an online degasser before entering the GPC instrument. The nominal flow rate is 1.0 ml/min and the nominal injection volume is 200 μL. The whole system including transfer lines, columns, and detectors are contained in an oven maintained at 145° C. The polymer sample is weighed and sealed in a standard vial with 80-μL flow marker (Heptane) added to it. After loading the vial in the autosampler, polymer is automatically dissolved in the instrument with 8 ml added TCB solvent. The polymer is dissolved at 160° C. with continuous shaking for about 1 hour for most PE samples or 2 hour for PP samples. The TCB densities used in concentration calculation are 1.463 g/ml at room temperature and 1.284 g/ml at 145° C. The sample solution concentration is from 0.2 to 2.0 mg/ml, with lower concentrations being used for higher molecular weight samples. The concentration (c), at each point in the chromatogram is calculated from the baseline-subtracted IR5 broadband signal intensity (I), using the following equation: $c=\beta I$, where $\beta$ is the mass constant. The mass recovery is calculated from the ratio of the integrated area of the concentration chromatography over elution volume and the injection mass which is equal to the pre-determined concentration multiplied by injection loop volume. The conventional molecular weight (IR MW) is determined by combining universal calibration relationship with the column calibration which is performed with a series of monodispersed polystyrene (PS) standards ranging from 700 to 10M gm/mole. The MW at each elution volume is calculated with following equation:

$$\log M = \frac{\log(K_{PS}/K)}{a+1} + \frac{a_{PS}+1}{a+1}\log M_{PS},$$

where the variables with subscript "PS" stand for polystyrene while those without a subscript are for the test samples. In this method, $\alpha_{PS}=0.67$ and $K_{PS}=0.000175$ while a and K are for other materials as calculated and published in literature (Sun, T. et al. *Macromolecules* 2001, 34, 6812), except that for purposes of the present disclosure, α=0.695 and K=0.000579 for linear ethylene polymers, α=0.705 and K=0.0002288 for linear propylene polymers, α=0.695 and K=0.000181 for linear butene polymers, a is 0.695 and K is 0.000579*(1−0.0087*w2b+0.000018*(w2b)^2) for ethylene-butene copolymer where w2b is a bulk weight percent of butene comonomer, a is 0.695 and K is 0.000579*(1−0.0075*w2b) for ethylene-hexene copolymer where w2b is a bulk weight percent of hexene comonomer, and a is 0.695 and K is 0.000579*(1−0.0077*w2b) for ethylene-octene copolymer where w2b is a bulk weight percent of octene comonomer. Concentrations are expressed in $g/cm^3$, molecular weight is expressed in g/mole, and intrinsic viscosity (hence K in the Mark-Houwink equation) is expressed in dL/g unless otherwise noted.

The comonomer composition is determined by the ratio of the IR5 detector intensity corresponding to $CH_2$ and $CH_3$ channel calibrated with a series of PE and PP homo/copolymer standards whose nominal value are predetermined by NMR or FTIR. In particular, this provides the methyls per 1000 total carbons ($CH_3/1000$ TC) as a function of molecular weight. The short-chain branch (SCB) content per 1000 TC (SCB/1000 TC) is then computed as a function of molecular weight by applying a chain-end correction to the $CH_3/1000$ TC function, assuming each chain to be linear and terminated by a methyl group at each end. The weight % comonomer is then obtained from the following expression in which f is 0.3, 0.4, 0.6, 0.8, and so on for $C_3$, $C_4$, $C_6$, $C_8$, and so on co-monomers, respectively:

$$w2 = f*SCB/1000 \text{ TC}.$$

The bulk composition of the polymer from the GPC-IR and GPC-4D analyses is obtained by considering the entire signals of the $CH_3$ and $CH_2$ channels between the integration limits of the concentration chromatogram. First, the following ratio is obtained $$\text{Bulk IR ratio} = \frac{\text{Area of } CH_3 \text{ signal within integration limits}}{\text{Area of } CH_2 \text{ signal within integration limits}}.$$

Then the same calibration of the $CH_3$ and $CH_2$ signal ratio, as mentioned previously in obtaining the CH3/1000 TC as a function of molecular weight, is applied to obtain the bulk CH3/1000 TC. A bulk methyl chain ends per 1000 TC (bulk CH3end/1000 TC) is obtained by weight-averaging the chain-end correction over the molecular-weight range. Then $w2b=f^*\text{bulk CH3/1000 TC}$ bulk SCB/1000 TC=bulk CH3/1000 TC–bulk CH3end/1000 TC, and bulk SCB/1000 TC is converted to bulk w2 in the same manner as described above.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed.; Academic Press, 1972):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle $\theta$, c is the polymer concentration determined from the IR5 analysis, $A_2$ is the second virial coefficient, $P(\theta)$ is the form factor for a monodisperse random coil, and $K_o$ is the optical constant for the $$K_o = \frac{4\pi^2 n^2 (dn/dc)^2}{\lambda^4 N_A},$$

where $N_A$ is Avogadro's number, and (dn/dc) is the refractive index increment for the system. The refractive index, n=1.500 for TCB at 145° C. and $\lambda$=665 nm. For analyzing polyethylene homopolymers, ethylene-hexene copolymers, and ethylene-octene copolymers, dn/dc=0.1048 ml/mg and $A_2$=0.0015; for analyzing ethylene-butene copolymers, dn/dc=0.1048*(1−0.00126*w2) ml/mg and $A_2$=0.0015 where w2 is weight percent butene comonomer.

MW reported in the Tables below is weight average molecular weight. Density is determined according to ASTM 1505.

Aromatic content is determined by Gas Phase Chromatography as follows:

Scope:

The following multiple headspace GC-MS (SIM) method is addressed to the quantification of trace level of aromatics such as toluene in polymer (such as polyethylene) samples. A polymer (such as polyethylene) sample is heated in the headspace autosampler for a time in order to establish the equilibrium between the polymer and its headspace. A fraction of the gas phase is then automatically injected into the capillary GC column. The sample is thermostatted and sampled in two more identical cycles to complete a multiple headspace extraction (MHE) of the polymer.

The peak areas obtained during the three MHE steps are extrapolated to infinity in order to calculate the polymer's total aromatic (such as toluene) content. Pure standard solutions of the aromatic of interest (such as toluene) at different concentration level were injected, and run under exactly the same conditions.

Test LOQ value: ~4 ppb
Test duration: 3 hours
Experimental Conditions
Sample Preparation:
Sample:
One gram of polymer sample is placed in a vial (Perkin Elmer part number B0104236), and sealed tightly with a headspace crimp cap containing a spring and a PTFE/silicone liner (Perkin Elmer part number B0104242).
External References of Toluene:
Four reference solutions of toluene at a final concentration of 1000 ppb, 200 ppb, 20 ppb and 10 ppb are prepared, diluted in the high boiling vacuum pump fluid Inland 45 (100% synthetic aliphatic hydrocarbon). One gram of each reference solution is placed in a headspace vial and run under exactly the same conditions as the sample. Each solution is injected in triplicate.
Blank:
A blank prepared from one gram of the high boiling vacuum pump fluid is injected in the GC-MS under the same conditions. In case of impurity the area of the target toluene is corrected for the corresponding areas of the blank. Injection is performed in triplicate.
Instrument and Test Conditions:
All the applications were performed on a system consisting of a headspace autosampler Perkin Elmer Turbomatrix 4 couple with a gas chromatography 7890A Agilent coupled with a single quadrupole mass spectrometer inert MSD 5975C Triple Axis.
Headspace Conditions:

| Method: | mhe pp 200 | |
|---|---|---|
| Temp: | oven: | 175° C. |
| | needle: | 185° C. |
| | transfer: | 200° C. |
| Timing: | thermo: | 30 min |
| | pressurize: | 3 min |
| | inject: | 0.06 min |
| | withdraw: | 0.5 min |
| | cycle time: | 30.0 min |
| PPC: | 22 psi | |
| Operation Mode: | MHE # 3* | |

*meaning: 3 headspace cycle per sample

GC-Conditions:
Column: Agilent HP-Ultra 2 P.N. 19091B-115 (Phenyl methyl siloxane stationary phase) 50 m×0.32 mm×0.52 m+a fragment of 0.17 m×0.1 mm uncoated column directed to the MS transfer line.
Operational mode constant flow: 1.8 ml/min
Oven program: from 50° C. (5 min) to 120° C. at 10° C./min, than to 300° C. at 50° C./min (5 min).

| Inlet temperature: | 250° C. |
|---|---|
| pressure: | 15.5 psi |
| injection mode: | split/splitless |
| split ratio: | 1:10 |

MS conditions: Electron ionization, in selected ion monitoring mode (SIM) 92 m/z. Transfer line temperature 260° C. and Ion source 230° C.

Calculations:
Data to be entered for the reference are:
The weight of the reference in grams (gr)
The concentration of the reference component in wtppb
The areas of the toluene peak (areas $A_1$, $A_2$ and $A_3$ for the first, the second and the third cycle run, respectively)
k, the total area $A_{tot}$ and the response factor, RF, are calculated:

$$k = \frac{\ln A_1 - \ln A_3}{3-1}$$

$$A_{tot} = \frac{A_1}{1 - e^{-k}}$$

$$RF_{ref} = \frac{A_{tot}}{\text{weight reference} * conc.ref.comp.\text{(in } wtppb\text{)}}$$

Data to be entered for the sample are:
Weight of polymer sample in grams (gr)
The areas of the different volatile component (areas $A_1$, $A_2$ and $A_3$ for the first, second and the third cycle run, respectively)
The concentration of the volatile component in the sample is then calculated as:

$$Wtppb \text{ volatile} = \frac{A_{tot}}{RF_{ref} * \text{weight sample (in gr)}}$$

While the above example is for toluene, the same procedure is applied for other aromatics.

EXAMPLES

Trimethylaluminum (molecular weight 72.1 g/mol, density 0.752 g/cm$^3$) was purchased from Sigma Aldrich (St. Louis, Mo.) or AkzoNobel and used as obtained, unless stated otherwise. ES70™ silica was obtained from PQ Corporation. ES70-875 is ES70™ silica that has been calcined at 880° C. for four hours after being ramped to 880° C. according to the following ramp rates.

| ° C. | ° C./h | ° C. |
|---|---|---|
| ambient | 100 | 200 |
| 200 | 50 | 300 |
| 300 | 133 | 400 |
| 400 | 200 | 800 |
| 800 | 50 | 880 |

SMAO-ES70-875: Methylalumoxane treated silica was prepared in a manner similar to the following:
In a 4 L stirred vessel in a drybox methylalumoxane (MAO, 30 wt % in toluene, approx. 1000 grams) is added along with approx. 2000 g of toluene. This solution is then stirred at 60 RPM for 5 minutes. Next, approx. 800 grams of ES-70™ silica (PQ Corporation, Conshohocken, Pa.) that has been calcined at 875° C. (see above) is added to the vessel. This slurry is then heated at 100° C. and stirred at 120 RPM for 3 hours. The temperature is then reduced to 25° C. and cooled to temperature over 2 hours. Once cooled, the vessel is set to 8 RPM and placed under vacuum for 72 hours. After emptying the vessel and sieving the supported MAO, approximately 1100 g of supported MAO will be collected. All solvents were purchased from Sigma Aldrich, were anhydrous grade and were further treated with activated 3 Angstrom molecular sieves by storing the solvent in a container with 5-10 wt % molecular sieves at least for overnight before use. All reactions were performed under an inert nitrogen atmosphere, unless otherwise stated. All deuterated solvents were obtained from Cambridge Isotopes (Cambridge, Mass.) and dried over 3 Angstrom molecular sieves before use. Acetone had a molecular weight of 58.1 g/mol and a density of 0.785. Methacrylic acid had a molecular weight of 86.09 g/mol. Valeric acid had a molecular weight of 1102.1 g/mol and a density of 0.93.

Example 1

AlMe$_3$ (2.00 ml, 1.5 g, 20.9 mmol) was added to 25 ml of dried, degassed n-pentane. This was cooled to −20° C. prior to addition of the acetone (0.515 ml, 0.404 g, 6.95 mmol). The acetone (degassed) was added in 5 aliquots over about 1 minute (Al/O=3 mol/mol). After stirring for about 20 minutes, 3.2 g of silica was added to this solution (Al/SiO$_2$=6.5 mmol/g).
The pentane was removed under vacuum. The product was heated in a sealed tube for 16 h at 170° C., resulting in a free flowing colorless powder.

Example 2

AlMe$_3$ (2.00 ml, 1.504 g, 20.86 mmol) was added to 25 ml of dried, degassed n-pentane. This was cooled to −20° C. prior to addition of the acetone (0.772 ml, 0.606 g, 10.43 mmol). The acetone (degassed) was added in 5 aliquots over about 1 minute (Al/O=2 mol/mol). After stirring for about 10 minutes, the pentane was dried down and then 3.2 ml of pentane was added, 1.6 g of silica (ES70-875) was added to this in a semi-incipient wetness technique and this resulting paste was stirred with a spatula for several minutes (Al/SiO$_2$=13 mmol/g). The pentane was then removed under vacuum. The resulting dry, free flowing powder was heated in a sealed tube for 16 h at 170° C., resulting in a free flowing colorless powder.

Example 3

AlMe$_3$ (2.00 ml, 1.504 g, 20.86 mmol) was added to 25 ml of dried, degassed n-pentane. This was cooled to −20° C. prior to addition of the acetone (0.800 ml, 0.628 g, 10.81 mmol). The acetone (degassed) was added in 5 aliquots over about 30 seconds (Al/O=1.93 mol/mol). After stirring for about 2 hours, the pentane was dried down and then 3.0 ml of pentane was added. 1.6 g of silica (ES70-875) was added to this in a semi-incipient wetness technique and this resulting paste was stirred with a spatula for several minutes (Al/SiO$_2$=13 mmol/g). The pentane was then removed under vacuum. The resulting dry, free flowing powder was heated in a sealed tube for 16 h at 120° C.

Example 4

AlMe$_3$ (2.00 ml, 1.504 g, 20.86 mmol) was added to 25 ml of dried, degassed n-pentane. This was cooled to −20° C. prior to addition of the methacrylic acid (0.599 ml, 0.599 g, 6.95 mmol). The methacrylic acid (degassed) was added in 5 aliquots over about 30 seconds (Al/acid=3 mol/mol). There was a rapid, vigorous reaction. After stirring for about 10 minutes the pentane was dried down and then 3.0 ml of pentane was added. The 1.6 g of silica (ES70-875) was added to this in a semi-incipient wetness technique and this resulting paste was stirred with a spatula for several minutes (Al/SiO$_2$=13 mmol/g). The pentane was then removed under vacuum. (Example-4B) Yield=3.18 g. 1.53 g of the resulting dry, free flowing powder was heated in a sealed tube for 16 h at 120° C., to give a colorless free flowing powder (Example-4C).

Example 5

AlMe$_3$ (2.00 ml, 1.504 g, 20.86 mmol) was added to 30 ml of dried, degassed n-pentane. This was cooled to −20° C. prior to addition of the valeric acid (0.763 ml, 0.710 g, 6.95 mmol). The valeric acid (degassed) was added in 5 aliquots over about 30 seconds (Al/acid=3 mol/mol). There was a rapid, vigorous reaction. The pentane was dried down and then 3.0 ml of pentane was added. This made a very viscous solution, much more viscous than that given with using methacrylic acid. 1.6 g of silica (ES70-875) was added to this in a semi-incipient wetness technique and this resulting paste was stirred with a spatula for several minutes (Al/SiO$_2$=13 mmol/g). It was much more difficult for the solution to be absorbed by the silica than in the previous Examples 1-4. Eventually, however, the solution was absorbed. The pentane was then removed under vacuum (Example-5B) resulting in a dry, free flowing powder that was heated in a sealed tube for 16 h at 120° C., to give a colorless free flowing powder (Example-5C).

Catalyst Supportation

A supported catalyst was made from each of the isolated support/activators in examples 1-5 by slurring the solid/activator in pentane and adding a bis(n-propylcyclpentadienyl)hafniumdimethyl over the course of about 1 min. The loading of bis(n-propylcyclpentadienyl)hafniumdimethyl was 40 μmol Hf/(gram support/activator). The catalyst was then isolated as a dry free flowing powder by drying under vacuum.

Example 6

AlMe$_3$ (10.00 ml, 7.52 g, 104 mmol) was added to ca. 48 ml of dried, degassed n-pentane. This was cooled to 0° C. prior to addition of methacrylic acid (2.99 ml, 2.99 g, 34.8 mmol) and stirred in a cold bath at 0° C. The methacrylic acid (degassed) was added in 10 aliquots over about 2 minutes (Al/acid=3 mol/mol), there was a rapid, vigorous reaction creating a white cloud. After stirring for about 20 minutes the reaction was removed from the cold bath and allowed to stir at room temperature for 20 minutes. The result was a clear solution. 16 g of silica (ES70-875) was added to this providing a thick paste (Al/SiO$_2$=6.5 mmol/g). An additional 10 ml of pentane was added, and the resulting slurry was stirred for 20 minutes at room temperature. The pentane was then removed under vacuum over the course of several hours. A fine frit was used to slow the evaporation.

Example 7 Thermal Treatment of Supports

About 1.2 grams of supported MAO catalyst system precursor, previously made in Example 6, was placed in each of eight sealed stainless steel tubes and submerged in an oil bath at 120° C. for various amounts of time.

TABLE 7

| Example No. | Temp. (° C.) | Time (hr) |
|---|---|---|
| 7a | NA | 0 |
| 7b | 120 | 1 |
| 7c | 120 | 2 |
| 7d | 120 | 4 |
| 7e | 120 | 7 |
| 7f | 120 | 16 |
| 7g | 120 | 23 |
| 7h | 170 | 5 |

1.0 gram of each support/activator was weighed in a scintillation vial. 1.00 ml of the catalyst solution (bis(n-propylcyclpentadienyl)hafniumdimethyl in iso-hexane) was added to each vial in 0.250 ml aliquots while vortexing at moderate speed, to give a total of 40 umol bis(n-propylcyclpentadienyl)hafniumdimethyl per gram of support. 5.0 ml pentane was used as the slurry medium and the vortexing was for 20 minutes.

Example 8 Polymerization Experimental

A 2 L autoclave was heated to 110° C. and purged with N2 for at least 30 minutes. It was then charged with dry NaCl (350 g; Fisher, 5271-10 dehydrated at 180° C. and subjected to several pump/purge cycles and finally passed through a 16 mesh screen prior to use) and SMAO-ES70-875C (5 g) at 105° C. and stirred for 30 minutes. The temperature was adjusted to 85° C. At a pressure of 2 psig N$_2$, dry, degassed 1-hexene (2.5 ml) was added to the reactor with a syringe then the reactor was charged with N$_2$ to a pressure of 20 psig. A mixture of H$_2$ and N$_2$ was flowed into reactor (120 mL; 10% H$_2$ in N$_2$) while stirring the bed.

Thereafter, the catalysts were injected into the reactor with ethylene at a pressure of 220 psig; ethylene flow was allowed over the course of the run to maintain constant pressure in the reactor. Subsequently, 1-hexene was fed into the reactor as a ratio to ethylene flow (0.1 g/g). Hydrogen was then fed to the reactor as a ratio to ethylene flow (0.5 mg/g). The hydrogen and ethylene ratios were measured by on-line GC analysis. Polymerizations were halted after 1 hour by venting the reactor, allowed to cool to room temperature (approx. 23° C.) and then exposed to air. The salt was removed by washing with water two times. The polymer was isolated by filtration, briefly washed with acetone and dried in air for at least two days.

TABLE 8

Polymerization Results

| Example No. | Support from Example No. | Catalyst (mg) | Yield [grams PE] | Productivity [g/gcat] |
|---|---|---|---|---|
| 8a | 1 | 15.2 | 9.1 | 599 |
| 8b | 2 | 23.2 | 48 | 2069 |
| 8c | 3 | 27.4 | 8.7 | 318 |
| 8d | 4 | 16 | 83.3 | 5206 |
| 8e | 5 | 21.6 | 3.8 | 352 |
| 8f | 7a | 20.6 | 11.1 | 539 |
| 8g | 7b | 19 | 56.1 | 2953 |
| 8h | 7c | 20.2 | 64.9 | 3212 |
| 8i | 7d | 20.8 | 84.3 | 4053 |
| 8j | 7e | 19.2 | 86.5 | 4505 |
| 8k | 7f | 20.2 | 103.3 | 5114 |
| 8l | 7g | 20.3 | 63.5 | 3128 |
| 8m | 7h | 10.5 | 80.1 | 7629 |

Overall, it has been discovered that the presence of saturated hydrocarbons (such as isopentane or hexane) in a catalyst system in combination with elimination of toluene does not significantly interfere with catalyst activity. It has been discovered that neither drying nor the addition of saturated hydrocarbon to catalyst systems of the present disclosure reduces the activity of the catalyst system for polymerization. In addition, methods of present disclosure provide catalyst systems at a lower financial cost due to improved possible storage time.

All documents described herein are incorporated by reference herein, including any priority documents and/or testing procedures to the extent they are not inconsistent with this text. As is apparent from the foregoing general description and the specific embodiments, while some embodiments have been illustrated and described, various modifications can be made without departing from the spirit and scope of the disclosure. Accordingly, it is not intended that the disclosure be limited thereby. Likewise, the term "comprising" is considered synonymous with the term "including." Likewise whenever a composition, an element or a group of elements is preceded with the transitional phrase "comprising", it is understood that we also contemplate the same composition or group of elements with transitional phrases "consisting essentially of," "consisting of", "selected from the group of consisting of," or "is" preceding the recitation of the composition, element, or elements and vice versa.

We claim:

1. A method for preparing supported alumoxane having no detectable amount of aromatic solvent comprising: 1) contacting at least one support material, at least one hydrocarbyl aluminum compound and at least one non-hydrolytic oxygen-containing compound in an aliphatic solvent at a temperature of less than 0 to −60° C., 2) thereafter separating excess of the aliphatic solvent, and forming a alumoxane precursor, and 3) heating the combination of the at least one support material and the alumoxane precursor to a temperature of about 60 to about 200° C. and forming the supported alumoxane with no detectable amount of aromatic solvent.

2. The method of claim 1, wherein the support material is silica, alumina, alumina-silica or a derivative thereof.

3. The method of claim 1, wherein the support material has an average particle size between 1 and 200 microns, an average pore volume of between 0.05 and 5 mL/g, and a surface area between 50 and 800 m²/g.

4. The method of claim 1, wherein the support material has been treated with one or more of a Bronsted acid, a Lewis acid, a salt and a Lewis base.

5. The method of claim 1, wherein the support material comprises a silylating agent.

6. The method of claim 1, wherein the support material comprises a hydrocarbyl aluminum compound.

7. The method of claim 1, wherein one or more of the support material, the hydrocarbyl aluminum compound and the alumoxane precursor comprises an electron withdrawing anion.

8. The method of claim 1, wherein the hydrocarbyl aluminum compound is $R_3Al$ wherein each R, which may be the same or different, is independently a hydrocarbon containing between 1 and 30 carbon atoms.

9. The method of claim 1, wherein the hydrocarbyl aluminum compound is selected from a combination of trimethyl aluminum and trioctylaluminum, and a combination of trimethyl aluminum and triisobutyl aluminum.

10. The method of claim 1, wherein the hydrocarbyl aluminum compound comprises trimethyl aluminum.

11. The method of claim 1, wherein the hydrocarbyl aluminum compound includes a mixture comprising an alumoxane.

12. The method of claim 1, wherein the non-hydrolytic oxygen-containing compound is one or more of carbon dioxide, a carboxylic acid, an ester, an anhydride, an alcohol or combination thereof.

13. The method of claim 1, wherein the non-hydrolytic oxygen-containing compound is one or more of carbon dioxide, a carboxylic acid, an ester, an anhydride and an alcohol or combination thereof, optionally containing water.

14. The method of claim 1, wherein the non-hydrolytic oxygen-containing compound is $R^1R^2C\!\!=\!\!CR^3CO_2H$ wherein each of $R^1$ and $R^2$ is independently hydrogen, alkyl, alkenyl, aryl or heteroatom containing group and $R^3$ is alkyl, alkenyl, aryl or heteroatom containing group.

15. The method of claim 1, wherein the non-hydrolytic oxygen-containing compound is methacrylic acid.

16. The method of claim 1, wherein the hydrocarbyl aluminum compound includes the non-hydrolytic oxygen-containing compound.

17. The method of claim 1, wherein the hydrocarbyl aluminum compound is one or more of trimethylaluminum, triethylaluminum, tripropylalumiuum, tri-n-butylaluminum, tri-isobutyl-aluminum, tri(2-methylpentyl)aluminum, tri-hexylaluminum, tri-n-octylaluminum, tri-n-decylaluminum, dimethyl aluminum methoxide, dimethyl aluminum ethoxide, dimethyl aluminum isopropoxide, dimethyl aluminum n-butoxide, dimethyl aluminum isobutoxide, diethyl aluminum methoxide, diethyl aluminum ethoxide, diethyl aluminum isopropoxide, diethyl aluminum n-butoxide, diethyl aluminum isobutoxide, diisobutyl aluminum methoxide, diisobutyl aluminum ethoxide, diisobutyl aluminum isopropoxide, diisobutyl aluminum n-butoxide, diisobutyl aluminum isobutoxide, di-n-hexyl aluminum methoxide, di-n-hexyl aluminum ethoxide, di-n-hexyl aluminum isopropoxide, di-n-hexyl aluminum n-butoxide, di-n-hexyl aluminum isobutoxide, methyl aluminum dimethoxide, methyl aluminum diethoxide, methyl aluminum diisopropoxide, methyl aluminum di-n-butoxide, methyl aluminum diisobutoxide, ethyl aluminum dimethoxide, ethyl aluminum diethoxide, ethyl aluminum diisopropoxide, ethyl aluminum di-n-butoxide, ethyl aluminum diisobtutoxide, isobutyl aluminum dimethoxide, isobutyl aluminum diethoxide, isobutyl aluminum diisopropoxide, isobutyl aluminum di-n-butoxide, isobutyl aluminum diisobutoxide, n-hexylaluminum dimethoxide, n-hexyl aluminum diethoxide, n-hexyl aluminum diisopropoxide, n-hexyl aluminum di-n-butoxide, n-hexyl aluminum diisobutoxide, aluminum trimethoxide, aluminum triethoxide, aluminum triisopropoxide, aluminum tri-n-butoxide, tetramethyldialuminumdiiso-propoxide, tetramethyldialuminumdi-tert-butoxide tetramethyldialuminumditert-butoxide, pentamethyldialuminumtert-butoxide and aluminum triisobutoxide.

18. The method of claim 1, wherein the hydrocarbyl aluminum compound is one or more of trimethylaluminum, triethylaluminum and dimethyl aluminum isobutoxide.

19. The method of claim 1, wherein at least one hydrocarbyl aluminum and at least one non-hydrolytic oxygen-containing compound are combined and then added to at least one support material.

20. The method of claim 1, wherein at least one hydrocarbyl aluminum compound and at least one non-hydrolytic oxygen-containing compound are combined under conditions of −10° C. to −50° C. prior to contact with the support material.

21. The method of claim 1, wherein at least one support material, at least one hydrocarbyl aluminum compound and at least one non-hydrolytic oxygen-containing compound are combined under conditions of 80° C. to 190° C.

22. The method of claim 1, wherein the support material is an amorphous silica with surface area of 300-400 m$^2$/gm and pore volume of about 0.9 cm$^3$/gm to about 1.8 cm$^3$/gm.

23. The method of claim 1, wherein the process is a continuous process comprising contacting in an aliphatic solvent at least one support material, at least one hydrocarbyl aluminum compound and at least one non-hydrolytic active oxygen-containing compound to produce a silica supported alumoxane, separating the silica supported alumoxane from the aliphatic solvent, and recycling the aliphatic solvent.

24. A method for preparing supported alumoxane having no detectable amount of aromatic solvent comprising: 1) contacting at least one hydrocarbyl aluminum compound and at least one non-hydrolytic oxygen-containing compound in an aliphatic solvent at a temperature of less than 0 to −60° C., 2) thereafter contacting with a support material at a temperature of from −80 to 200° C., and forming an alumoxane precursor, 3) separating the aliphatic solvent, and 4) heating the combination of the support material and the alumoxane precursor to a temperature of about 60 to about 200° C. and forming the supported alumoxane with no detectable amount of aromatic solvent.

25. The method of claim 24 wherein, the combination is the form of an aliphatic solvent slurry or a solid.

\* \* \* \* \*